(12) United States Patent
Peuchert et al.

(10) Patent No.: US 9,105,908 B2
(45) Date of Patent: Aug. 11, 2015

(54) COMPONENTS FOR BATTERY CELLS WITH INORGANIC CONSTITUENTS OF LOW THERMAL CONDUCTIVITY

(75) Inventors: Ulrich Peuchert, Bodenheim (DE); Andreas Roters, Mainz (DE); Frank-Thomas Lentes, Bingen (DE); Meike Schneider, Taunusstein (DE); Ulf Dahlmann, Gau-Odernheim (DE); Wolfram Beier, Essenheim (DE); Wolfgang Schmidbauer, Mainz (DE); Gabriele Roemer-Scheuermann, Ingelheim (DE)

(73) Assignee: SCHOTT AG, Mainz (DE)

( * ) Notice: Subject to any disclaimer, the term of this patent is extended or adjusted under 35 U.S.C. 154(b) by 173 days.

(21) Appl. No.: 13/638,879

(22) PCT Filed: Mar. 29, 2011

(86) PCT No.: PCT/EP2011/001570
§ 371 (c)(1),
(2), (4) Date: Jan. 4, 2013

(87) PCT Pub. No.: WO2011/124347
PCT Pub. Date: Oct. 13, 2011

(65) Prior Publication Data
US 2013/0136981 A1    May 30, 2013

(30) Foreign Application Priority Data

| Mar. 29, 2010 | (DE) | 10 2010 013 293 |
| Mar. 29, 2010 | (DE) | 10 2010 013 294 |
| Mar. 29, 2010 | (DE) | 10 2010 013 295 |

(51) Int. Cl.
*H01M 2/16* (2006.01)
*C03C 12/00* (2006.01)
(Continued)

(52) U.S. Cl.
CPC .............. *H01M 2/1646* (2013.01); *C03C 12/00* (2013.01); *H01M 4/62* (2013.01);
(Continued)

(58) Field of Classification Search
CPC .............. Y02E 60/122; H01M 10/052; H01M 10/0525; H01M 10/0562; H01M 6/18; H01M 2300/0068; H01M 2300/0091; H01M 2/1686; H01M 2/1646; H01M 2300/0071
See application file for complete search history.

(56) References Cited

U.S. PATENT DOCUMENTS

| 6,511,774 B1 | 1/2003 | Tsukuda et al. |
| 2004/0053138 A1 | 3/2004 | Otterstedt et al. |

(Continued)

FOREIGN PATENT DOCUMENTS

| CN | 101040401 A | 9/2007 |
| DE | 198 38 800 C1 | 3/2000 |

(Continued)

OTHER PUBLICATIONS

Japanese Office Action dated Apr. 10, 2014 corresponding to Japanese Patent App. No. 2013-501682 with English translation, 20 pp.

(Continued)

*Primary Examiner* — Stewart Fraser
(74) *Attorney, Agent, or Firm* — Ohlandt, Greeley, Ruggiero & Perle, LLP

(57) ABSTRACT

A lithium-ion battery cell is provided that includes at least one inorganic, multi-functional constituent that has a low thermal conductivity and is suitable for reducing or restricting thermal anomalies at least locally.

26 Claims, 7 Drawing Sheets

(51) Int. Cl.
  *H01M 4/62* (2006.01)
  *H01M 10/0525* (2010.01)
  *H01M 10/42* (2006.01)
  *H01M 10/0562* (2010.01)

(52) U.S. Cl.
  CPC ..... *H01M 10/0525* (2013.01); *H01M 10/0562* (2013.01); *H01M 10/4235* (2013.01); *H01M 2300/0088* (2013.01); *Y02E 60/122* (2013.01)

(56) References Cited

U.S. PATENT DOCUMENTS

| | | | |
|---|---|---|---|
| 2004/0234863 A1* | 11/2004 | Yoshimura et al. | 429/247 |
| 2007/0048617 A1 | 3/2007 | Inda | |
| 2007/0048619 A1 | 3/2007 | Inda | |
| 2008/0158817 A1 | 7/2008 | Tsunoda et al. | |
| 2011/0030296 A1 | 2/2011 | Joret et al. | |

FOREIGN PATENT DOCUMENTS

| | | |
|---|---|---|
| DE | 198 50 826 A1 | 5/2000 |
| DE | 101 01 299 A1 | 4/2002 |
| DE | 101 42 622 A1 | 3/2003 |
| DE | 102 08 277 A1 | 9/2003 |
| DE | 102 38 944 A1 | 3/2004 |
| DE | 103 01 404 A1 | 7/2004 |
| DE | 103 36 380 A1 | 3/2005 |
| DE | 11 2007 001 087 T5 | 2/2009 |
| EP | 1050913 | 11/2000 |
| EP | 1184927 A1 | 3/2002 |
| EP | 1 505 680 A2 | 2/2005 |
| EP | 1760819 | 3/2007 |
| EP | 2131421 | 12/2009 |
| JP | 09190838 A | 7/1997 |
| JP | 2003323878 A | 11/2003 |
| JP | 2004111229 A | 4/2004 |
| JP | 2005-011614 A | 1/2005 |
| JP | 2005011614 A | 1/2005 |
| WO | 2009/069928 A2 | 6/2009 |
| WO | 2009/103537 A1 | 8/2009 |

OTHER PUBLICATIONS

W.M. Haynes, "Thermal conductivity of glasses," in "Handbook of Chemistry and Physics, 91st Ed. Internet Version 2011," May 20, 2011, pp. 12-205 to 12-208. XP-002638567.

International Search Report dated Aug. 29, 2011 corresponding to International Patent Application No. PCT/EP2011/001570.

Sheng Shui Zhang, "A review on the separators of liquid electrolyte Li-ion batteries", Journal of Power Sources, vol. 164, Issue 1, (Jan. 10, 2007), pp. 351-364.

Kim, et al., "Lithium Ion battery safety study using multi-physics Internal Short circuit model", The 5th International Symposium on Large Lithium Ion Battery Technology and Application in Junction with AABC2009, Long Beach, CA, (Jun. 9-10, 2009), pp. 1-30.

Chinese Office Action dated Jun. 5, 2014 corresponding to Chinese Patent Application No. 201180017524.6 with English translation, 17 pp.

English translation of International Preliminary Report on Patentability dated Oct. 2, 2012 corresponding to International Patent Application No. PCT/EP2011/001570, 27 pages.

Japanese Office Action dated Oct. 28, 2014 corresponding to Japanese Patent App. No. 2013-501682 with English translation, 4 pages.

English translation of Written Opinion dated Aug. 29, 2011 corresponding to International Patent Application No. PCT/EP2011/001570, 26 pages.

\* cited by examiner $I_1$ = x Ampere $I_2$ = Y Ampere

X < Y

COMPONENTS FOR BATTERY CELLS WITH INORGANIC CONSTITUENTS OF LOW THERMAL CONDUCTIVITY

The invention generally relates to battery cells, preferably lithium-ion cells, and in particular to components for rechargeable lithium-ion cells with inorganic constituents of low thermal conductivity.

Current rechargeable lithium-ion cells substantially comprise:
- two electrodes (anode/cathode) from which Li ions escape and into which Li ions are embedded, respectively;
- a separator which prevents an electrical short circuit;
- a liquid electrolyte which enables Li ion migration.

Current separators for lithium-ion rechargeable batteries or secondary batteries either use membranes of polyethylene, polypropylene, or combinations thereof (Zhang: "A review on the separators of liquid electrolyte Li ion batteries", J. of Power Sources 164 (2007) 351-364). Alternatively, fabrics of randomly arranged fibers, referred to as nonwovens, are discussed, which are superior to conventional membranes in a number of properties, in particular in terms of shrinkage and thermal stability.

In the wake of increasing safety requirements due to applications in electro-mobility, separators coated or infused with inorganic particles have been proposed, both based on membranes and on polymer nonwovens (EVONIK DE 10208277, DE 10238944; Freudenberg WO2009103537; BASF DE19850826; LG CHEM WO09069928). Particles mentioned in conjunction therewith are for example crystalline oxidic materials of simple composition, such as $Al_2O_3$, $SiO_2$, $BaTiO_3$, and the like. Incorporation of inorganic particles increases the thermal stability of the component in case of heating of the cell and delays or even prevents electrical short-circuiting thereof.

Use of "glass" in conjunction with separators is mentioned in the documents as listed below. The glass is either directly incorporated into the carrier as a fiber (EVONIK DE10142622, FHG/ICT DE19838800C1, Freudenberg DE10336380) or in form of a powder particle is an optional constituent of a coating or impregnation (Freudenberg WO2009103537, LG CHEM WO09069928, BASF DE19850826). The variety of employed glasses according to these documents ranges from "ground glass/micro glass" (BASF, see above) to alkali/alkaline earth sulfates, carbonates, or Li borates (Freudenberg, see above).

More specific information on the chemistry of glass in a separator structure is given by Teijin in Japanese Unexamined Patent Application JP2005011614. This document describes the use of glass, for example in form of a powder, however without specifying the powder in more detail apart from the grain size. Besides the particle size, in particular the specific surface area, agglomeration degree and other factors influence the adhesion or chemical interaction.

Patent document DE 103 01 404 B4 describes a planar fuel cell with operating temperatures from 500° C. to 750° C., which includes a glass electrolyte. Glasses mentioned in this context are silicate glasses with a $T_g$ ranging from 300° C. to 400° C. The glasses may include one or more of additives such as $B_2O_3$, $K_2O$, $Li_2O$, $V_2O_5$, $Fe_3O_4$, but also $Al_2O_3$, MgO, CaO, BaO, or $Na_2O$.

Publication document DE 11 2007 001 087 T5 discloses an active electrode material which comprises an inorganic layer with acidic properties to increase the performance of the battery. The inorganic layer comprises a metal or ceramics, or compounds thereof. Furthermore, the inorganic substance may comprise one or more elements of a group comprising alkaline earth metals, alkali metals, transition metals, lanthanide metals, and actinide metals.

A drawback of the existing approaches is, inter alfa, the increasing cost caused by the coating of the already very expensive separators. Although ensuring enhanced safety is appreciated on the user's side, for example in terms of resistance in the event of an increased external impact, or avoiding a collapse of the separator function in the event of an uncontrolled temperature rise of the cell, other active functions of particles besides that of a simple spacer, in particular in case of local damage, is desirable in order to further improve the cell properties. Exemplary additional functions may be of electrical nature, such as ionic conductivity, or dielectric properties. Examples that can be mentioned here again are BASF DE19850826, and LG CHEM WO09069928: Here, again, expensive and chemically poorly variable ceramic particles of therefore poorly variable properties are employed, such as $BaTiO_3$. Only WO09069928 mentions ionically conducting glasses of the $(LiAlTiP)_xO_y$ type, or substantially sulphidic glasses. In FhG/Itzehoe DE10101299, these comprise ionically conducting ceramic particles such as $Li_{1.3}Al_{0.3}Ti_{1.7}(PO_4)_3$, in OHARA JP (US20070048617, US20070048619) glass-ceramic particles with crystalline phases (NaSiCON) of high conductivity.

Generally, the presence of a very temperature stable crystalline material, for example in the region of the separator, is useful in case a "thermal runaway" encompassing the whole cell has already occurred, such as in the event of a homogeneous temperature rise due to an overload, or by operating at excessive temperatures. Due to the presence of e.g. $Al_2O_3$ particles, the spacing between the two electrodes is ensured in case of a melt-away or shearing-off of the polymer separator due to e.g. global elevated temperatures. However, in this case the cell is generally no longer useful.

Besides the global, i.e. referring to the total cell, widespread heating of the cell by improper use/application or due to general effects of aging, anomalous local disturbances in cell operation may arise. These include in particular the occurrence of "internal short circuits" (ISC) which means the formation of an unwanted connection between anode and cathode by an electronically well conductive metallic material. This will produce locally occurring anomalous thermal effects, which means local heating or overheating. Such metallic interconnects may be caused, inter alia, by:
- formation of dendrites of Li metal from the anode towards the cathode, caused, e.g., by overcharging or incorrect charging at low temperatures;
- sharp-edged metal particles which erratically have been introduced into the cell in the course of cell production, for example when punching current diverters/flags from aluminum or copper;
- violations of a cell from the outside, especially in case of pouch cells.

Depending on the cell type and capacity, the depth or starting point of the short circuit, and the short circuit area (e.g. 1×1 $mm^2$), short-circuit resistances may range within a few mΩ, currents may be in a range of several 100 A, and corresponding current densities in a range of several hundred amperes/$mm^2$.

Depending on the site of contacting, for example between electrode layers or diverters, this event results in an anomalous local heating with temperatures of up to 800° C. at the penetration site, see e.g. Kim et al: Lithium Ion battery safety study using multi-physics Internal Short circuit model. The 5th International Symposium on Large Lithium Ion Battery Technology and Application in Junction with AABC2009, Long Beach, Ca, Jun. 9-10, 2009.

A heat-conducting inorganic crystalline particle, when incorporated into the separator or electrode, will not prevent the heat at the penetration site from spreading over large areas, due to its high thermal conductivity, ($Al_2O_3$, about 45 $W·K^{-1}·m^{-1}$ at room temperature, and 30 $W·K^{-1}·m^{-1}$ at 130° C.), and the result is an unwanted and dangerous thermal runaway. Crystalline $Al_2O_3$ fails to restrict the damage.

As for a provision of crystalline particles on or into a separator, the relatively low thermal conductivity of the separator material (polyethylene: about 0.4 $W·K^{-1}·m^{-1}$; polypropylene about 0.2 $W·K^{-1}·m^{-1}$) is adversely influenced by the high conductivity of e.g. $Al_2O_3$.

Another requirement, besides safety, is increased efficiency. Current lithium-ion cells have energy densities and power densities of about 150 Wh/kg and 400 Wh/l, respectively. Targeted levels, in particular for electro-mobility applications, are 200 Wh/kg, ideally even more than 1000 Wh/kg. A leverage to higher efficiencies is to increase the ionic conductivity of the commonly used liquid electrolytes based on the conductive salt $LiPF_6$. The conductivity thereof ideally ranges from $10^{-2}$ to $10^{-3}$ S/cm. Approaches to increase the dissociation of the conductive salt (or to provide positive effects on the solvation shell) are described in EP 1505680: Nanoscale particles of mainly amorphous $SiO_2$ are to increase the conductivity of conventional liquid electrolytes by a factor of up to 3.

However, adding $SiO_2$ may adversely alter the viscosity and hence the processability of a liquid electrolyte specifically adjusted for these applications.

Another alternative to increase the specific energy or power densities is to increase the operating voltage. Currently, voltages of up to 3.7 V can be achieved, charging takes place at about 4.2 V. The materials currently employed, especially those including organics, are currently not compatible with the higher operating/charging voltages.

Also regarding the useful life, current cells should undergo new developments. The useful life desirable for electric mobility and especially for stationary applications is more than 10 or even more than 20 years. Therefore, provisions are desired which prevent or at least mitigate aging.

One aspect of degradation over time is the release of hydrofluoric acid, HF, in case of an excessive initial or possibly even later occurring entry of water into the cell.

Current solutions essentially comprise to perform material and component production processes and cell production in a very dry, water-free environment, and to protect the components from moisture absorption (see lamination process, Fraunhofer DE10101299). Additionally, organic HF getters may be used.

An object of the invention is to provide damage restricting solutions for locally occurring anomalous thermal effects such as those especially caused by internal short circuits, and hence to contribute to safety and life time improvements of battery cells, in particular of rechargeable lithium-ion cells.

Moreover, an object of the invention is to provide materials for lithium-ion cells and components based thereon, which improve other properties such as efficiency and durability while accounting for the cost of the lithium-ion system.

This object is achieved by a battery cell, preferably a lithium-ion cell, which comprises components that include at least one inorganic, preferably multi-functional constituent, which constituent exhibits a low thermal conductivity and thereby is particularly suitable to reduce or at least locally restrict thermal anomalies.

A low thermal conductivity is considered to comprise levels of less than 2.5 $W·K^{-1}·m^{-1}$.

The inorganic, preferably multi-functional constituent may substantially comprise oxidic, temperature-stable, poorly thermally conductive particles of glass material or another glass-based material, such as glass-ceramics, or phase-demixed or multiphase glass composites, or may consist thereof.

Glass in the context of this disclosure is to be understood as a structurally amorphous, preferably inorganic material, at least in portions thereof, which results from a melting process and subsequent rapid cooling, or from a sol-gel process.

A glass-ceramic in the context of this disclosure is a material that was obtained by melting and became partially crystalline by a subsequent thermal process, or which includes certain crystals in a glassy matrix. The glass-ceramic may also be ground.

The glasses have a viscosity adapted to its respective incorporation site (in/on the separator, in/on the anode or cathode, in the liquid or polymer electrolyte) and to the temperatures occurring upon an internal short circuit.

The glasses are generally inexpensive to manufacture and well suited for manufacturing processes of components and of the entire cell. In another embodiment, the glasses preferably have additional functions, for example to increase the efficiency and/or useful life of battery cells.

In detail, the glasses preferably have the following bulk properties:

| Property | Preferred Levels |
|---|---|
| Thermal conductivity | <2.5 W * $K^{-1}$ * $m^{-1}$ |
| Particle size | D90 <150 µm, more preferably <25 µm, and most preferably <5 µm; >100 nm |
| Low electronic conductivity | <1 × $10^{-5}$ S/cm at room temperature |
| Thermal stability (with respect to evaporation) | up to 2000° C. |
| Mechanical stability | >400° C. |
| Volume fraction | 0.001 to 90% by volume |

The glass-based materials, especially glass or glass-ceramics or powders made therefrom, are stable to fluorine and phosphorus organic liquid electrolyte chemistry—even with a voltage applied.

Preferred characteristics of the inorganic constituents described herein comprise the following three values defined below:
 a reciprocal thermal diffusivity;
 b slope of the viscosity curve as a function of temperature;
 c absolute value of the transformation temperature.

For a:

The glass should absorb heat locally the best possible and should not propagate it, which results in a measure that corresponds to the reciprocal thermal diffusivity:

$$a = \frac{\rho \cdot c_P}{\lambda}$$

wherein $\rho$ is the density in g/cc; $c_P$ is the specific heat capacity in J/(g·K); and $\lambda$ is the thermal conductivity in W/(m·K). Here, the thermal conductivity is measured at 90° C. or specified for this temperature.

For b:

The glass particles must or at least should be provided locally within the battery, which means if they melt they must not become so fluid as to "drip off". However, they should be deformable to a degree to be able to enclose the "hot spot" in a battery and thereby restrict or even extinguish it.

From a minimum temperature up, the glass particles should be sufficiently viscously deformable so as to enable or facilitate an encapsulation process. Preferably, the viscosity of the softening glass particles should decrease to a degree as to result in coagulation thereof and thereby encapsulation of the hot spot.

$$b = \frac{T_{7.6} - T_{13}}{13 - 7.6} = \frac{T_{7.6} - T_{13}}{5.4}$$

with T in K, wherein $T_{7.6}$ and $T_{13}$ denote the temperatures at which the decadic logarithm of the respective viscosity, $\eta$, measured in dPa·s, takes the values of 7.6 and 13, respectively.

For c:

$T_g$ effects the thermal mechanical stability according to the rule $c=T_g$ [K].

To achieve the object, two variations are possible. In a variation 1 slowly, relatively highly viscous or high-melting glasses are employed. A variation 2 employs glasses with a low $T_g$.

For variation 1, a parameter 1 is defined, according to which:

$$a*b*c \geq 50\ s \cdot K^2/m^2\ [\times 10^8] \qquad \text{(parameter 1);}$$

preferably $\geq 100$ to 3500 s·K²/m² [×10⁸];
more preferably $\geq 150$ to 3000 s·K²/m² [×10⁸];
most preferably $\geq 200$ to 2900 s·K²/m² [×10⁸].

Especially within the preferred ranges these slowly, relatively highly viscous or high-melting glasses accomplish a very beneficial protective function for the respective cell. These glasses form a highly viscous melt which does not drip off and which especially remains at its place without contracting into a drop. In this way, local thermal anomalies such as local overheating may be separated and may usually even be locally restricted.

Within the non-preferred ranges, the glass might become liquid too quickly, depending on the temperature generated by a short-circuit. Thus, the preferred glasses are suitable, inter alfa, in situations where the short circuit occurs between two diverter contacts: this form of short-circuit often results in temperatures of 500° C. or more.

For variation 2, a glass having a low $T_g$ is selected. With a low $T_g$, the glass softens or melts earlier. A too low $T_g$ value (about <250° C.) has to be avoided, so that even under high thermal loads during regular operation of the battery the glass granules do not soften too early.

As a parameter for the ability to locally restrict a hot spot by encapsulation, a parameter 2 is defined as follows:

$$a/(b*c) \geq 20\ s/(m^2 \cdot K^2) \qquad \text{(parameter 2);}$$

with a/(b*c) preferably from 40 s/(m²·K²) to 1200 s/(m²·K²); more preferably from 60 s/(m²·K²) to 1100 s/(m²·K²); yet more preferably from 80 s/(m²·K²) to 1000 s/(m²·K²); most preferably from 100 s/(m²·K²) to 800 s/(m²·K²).

Especially in the preferred ranges, these fast, comparatively low-melting glasses accomplish a very beneficial protective function for the respective cell. They form a melt having a low to moderate viscosity which is movable but does not drip off. This enables to separate and usually even locally restrict local thermal anomalies such as local overheating.

In the event of occurring internal short circuits with an associated high local temperature rise, the glasses of variation 1 according to the present invention may remain dimensionally stable and sinter or melt only comparatively slowly, if at all. The glasses of variation 2 according to the present invention, by contrast, may deform quickly and even tend to melt, also in case of internal short circuits with low temperature development.

Already this protective function of individual glasses of variations 1 and 2 is very beneficial. Moreover, mixtures such as particulate mixtures may provide further benefits.

These particulate mixtures may comprise a combination of glasses of variation 1 and glasses of variation 2 and thus form a variation 3.

Thus, rather high melting glasses of variation 1, i.e. for example glasses having a working point WP (temperature at which the viscosity of the melt is $10^4$ dPa·s) rather above 1000° C., may, in combination with glasses of variation 2 that melt at lower temperatures (WP rather below 1000° C.) still provide adequate mechanical stability in the melt compound, so that mechanical strength is still provided even if the cell or parts thereof heavily overheat.

A preferred mixing ratio of low-melting to high-melting glasses is 80:20, for example. Other ratios, e.g. of 50:50, are possible, depending on the application and glass characteristics. Generally, the respective glasses are provided in the following preferred and particularly preferred mixing ratios: from 50:50 to 80:20, of low-melting to high-melting glasses, and more preferably from 50:50 to 60:40, of low-melting to high-melting glasses.

Similarly, ceramic fractions or crystalline fractions may be added to the mixture, especially the particulate mixture.

The glasses/glass-ceramics may be provided in form of a powder, in fibrous shape, agglomerated, or as homogeneous, phase-demixed, or multi-phase glasses. The particles may have a surface texture, including for example a shell-like core/sheath structure. Surface-modified particles are likewise conceivable, e.g. silanized particles. As a coupling layer, the following may be used, for example:

3-aminopropyltriethoxy silane;
vinyl trimethoxy silane;
gamma-glycidoxypropyltrimethoxy silane;
methacryloyloxypropyltrimethoxysilane silane.

Surprisingly, it was found that a use of glass particles in lithium-ion batteries (i.e. particles introduced into components of lithium-ion cells) has a damage-limiting effect with respect to adverse internal short circuits, abbreviated "ISC" below.

Although the glass particles do not prevent general occurrence of an internal short circuit, ISC, they may level, diminish, or even locally restrict or locally isolate the locally occurring anomalous thermal effects caused thereby.

Advantageously, the thermal conductivity of these glasses is below 2.5 $W \cdot K^{-1} \cdot m^{-1}$, preferably below 2.0 $W \cdot K^{-1} \cdot m^{-1}$, and more preferably below 1.5 $W \cdot K^{-1} \cdot m^{-1}$.

Generally, the glass or glass-ceramic is stable in the liquid electrolyte, in particular in liquid electrolytes including $LiPF_6$.

Advantageously, the glass is a predominantly oxidic glass, and the fraction of non-oxidic elements does not exceed 35 mass %.

In this case the glass may comprise at least 80%, preferably 90%, more preferably 95% of oxygen as the anion, and is preferably free of chalcogenide anions (other than oxygen itself).

In particular, the glass may be an oxide-based multi-component glass.

The glass may be selected from the group comprising the silicate, borate, phosphate, and aluminate glass families.

Specifically, these include the following glasses:
borate glasses, such as lanthanum borate glasses, borosilicate glasses, lithium borate glasses, and others;
phosphate glasses, such as fluorophosphate glasses, lithium phosphate glasses, tin phosphate glasses, and others;
aluminate glasses, such as boroaluminate glasses, alkaline earth aluminate glasses, lithium aluminate glasses, and others;
silicate glasses, such as alumoborosilicate glasses, lithium silicate glasses, tantalum silicate glasses, and others.

Generally, certain optical glasses are also suitable for use in batteries.

Preferably, the glass has a composition of (given in wt %):

| Silicatic Glass | Min | Max |
|---|---|---|
| $SiO_2$ | 45 | 100 |
| $TiO_2$ | 0 | 10 |
| $ZrO_2$ | 0 | 10 |
| $Al_2O_3$ | 0 | 42 |
| $B_2O_3$ | 0 | 30 |
| $Fe_2O_3$ | 0 | 0.5 |
| $P_2O_5$ | 0 | 10 |
| MgO | 0 | 20 |
| CaO | 0 | 20 |
| BaO | 0 | 20 |
| MnO | 0 | 20 |
| ZnO | 0 | 10 |
| $Li_2O$ | 0 | 50 |
| $Na_2O$ | 0 | 10 |
| $K_2O$ | 0 | 10 |
| $La_2O_3$ | 0 | 10 |
| SrO | 0 | 10 |
| Halogen (elementary) | 0 | 20 |
| $As_2O_3$ | 0 | 1.5 |
| $Sb_2O_3$ | 0 | 1.5 |
| $Cs_2O$ | 0 | 10 |
| $Nb_2O_3$ | 0 | 40 |
| RE (except $La_2O_3$) | 0 | 5 |
| $SnO_2$ | 0 | 1.5 |
| NiO | 0 | 20 |
| CoO | 0 | 20 |
| $Ta_2O_5$ | 0 | 25 |
| SnO | 0 | 1.5 |
| SrO | 0 | 20 | or

| Phosphate Glass A | Min | Max |
|---|---|---|
| $SiO_2$ | 0 | 30 |
| $TiO_2$ | 0 | 40 |
| $ZrO_2$ | 0 | 10 |
| $Al_2O_3$ | 0 | 30 |
| $B_2O_3$ | 0 | 30 |
| $Fe_2O_3$ | 0 | 0.5 |
| $P_2O_5$ | 20 | 100 |
| MgO | 0 | 20 |
| CaO | 0 | 20 |
| BaO | 0 | 20 |
| MnO | 0 | 20 |
| ZnO | 0 | 10 |
| $Li_2O$ | 0 | 50 |
| $Na_2O$ | 0 | 10 |
| $K_2O$ | 0 | 10 |
| $La_2O_3$ | 0 | 10 |
| SrO | 0 | 10 |
| Halogen (elementary) | 0 | 35 |
| $As_2O_3$ | 0 | 1.5 |
| $Sb_2O_3$ | 0 | 1.5 |
| $Cs_2O$ | 0 | 10 |
| $Nb_2O_3$ | 0 | 40 |
| RE (except $La_2O_3$) | 0 | 5 |
| $SnO_2$ | 0 | 1.5 |
| NiO | 0 | 20 |
| CoO | 0 | 20 |
| $Ta_2O_5$ | 0 | 10 |
| SnO | 0 | 65 |
| SrO | 0 | 20 | or

| Phosphate Glass B | Min | Max |
|---|---|---|
| $SiO_2$ | 0 | 30 |
| $TiO_2$ | 0 | 40 |
| $ZrO_2$ | 0 | 10 |
| $Al_2O_3$ | 0 | 30 |
| $B_2O_3$ | 0 | 30 |
| $Fe_2O_3$ | 0 | 7.5 |
| $P_2O_5$ | 20 | 100 |
| MgO | 0 | 20 |
| CaO | 0 | 20 |
| BaO | 0 | 20 |
| MnO | 0 | 20 |
| ZnO | 0 | 20 |
| $Li_2O$ | 0 | 50 |
| $Na_2O$ | 0 | 35 |
| $K_2O$ | 0 | 30 |
| $La_2O_3$ | 0 | 10 |
| SrO | 0 | 10 |
| Halogen (elementary) | 0 | 35 |
| $As_2O_3$ | 0 | 1.5 |
| $Sb_2O_3$ | 0 | 1.5 |
| $Cs_2O$ | 0 | 10 |
| $Nb_2O_3$ | 0 | 40 |
| RE (except $La_2O_3$) | 0 | 5 |
| $SnO_2$ | 0 | 1.5 |
| NiO | 0 | 20 |
| CoO | 0 | 20 |
| $Ta_2O_5$ | 0 | 20 |
| SnO | 0 | 30 |
| SrO | 0 | 5 |
| CuO | 0 | 20 |
| $Bi_2O_3$ | 0 | 30 |
| $Sb_2O_5$ | 0 | 5 | or

| Borate Glass | Min | Max |
|---|---|---|
| $SiO_2$ | 0 | 30 |
| $TiO_2$ | 0 | 10 |
| $ZrO_2$ | 0 | 10 |
| $Al_2O_3$ | 0 | 30 |
| $B_2O_3$ | 20 | 100 |
| $Fe_2O_3$ | 0 | 0.5 |
| $P_2O_5$ | 0 | 10 |
| MgO | 0 | 20 |
| CaO | 0 | 20 |
| BaO | 0 | 20 |
| MnO | 0 | 20 |
| ZnO | 0 | 10 |

-continued

| | Borate Glass | |
|---|---|---|
| | Min | Max |
| $Li_2O$ | 0 | 50 |
| $Na_2O$ | 0 | 10 |
| $K_2O$ | 0 | 10 |
| $La_2O_3$ | 0 | 50 |
| SrO | 0 | 10 |
| Halogen (elementary) | 0 | 20 |
| $As_2O_3$ | 0 | 1.5 |
| $Sb_2O_3$ | 0 | 1.5 |
| $Cs_2O$ | 0 | 10 |
| $Nb_2O_3$ | 0 | 40 |
| RE (except $La_2O_3$) | 0 | 5 |
| $SnO_2$ | 0 | 1.5 |
| NiO | 0 | 20 |
| CoO | 0 | 20 |
| $Ta_2O_5$ | 0 | 10 |
| SnO | 0 | 1.5 |
| SrO | 0 | 20 | or

| | Aluminate Glass | |
|---|---|---|
| | Min | Max |
| $SiO_2$ | 0 | 30 |
| $TiO_2$ | 0 | 10 |
| $ZrO_2$ | 0 | 10 |
| $Al_2O_3$ | 25 | 100 |
| $B_2O_3$ | 0 | 30 |
| $Fe_2O_3$ | 0 | 0.5 |
| $P_2O_5$ | 0 | 10 |
| MgO | 0 | 20 |
| CaO | 0 | 20 |
| BaO | 0 | 20 |
| MnO | 0 | 20 |
| ZnO | 0 | 10 |
| $Li_2O$ | 0 | 50 |
| $Na_2O$ | 0 | 10 |
| $K_2O$ | 0 | 10 |
| $La_2O_3$ | 0 | 10 |
| SrO | 0 | 10 |
| Halogen (elementary) | 0 | 20 |
| $As_2O_3$ | 0 | 1.5 |
| $Sb_2O_3$ | 0 | 1.5 |
| $Cs_2O$ | 0 | 10 |
| $Nb_2O_3$ | 0 | 40 |
| RE (except $La_2O_3$) | 0 | 5 |
| $SnO_2$ | 0 | 1.5 |
| NiO | 0 | 20 |
| CoO | 0 | 20 |
| $Ta_2O_5$ | 0 | 10 |
| SnO | 0 | 1.5 |
| SrO | 0 | 20 |

As an alternative to bulk material or fibers, the at least one inorganic, preferably multi-functional constituent may comprise a powder, in particular glass powder.

In another preferred embodiment, the glass may intercept HF by forming Si—F bonds.

Advantageously, the glass powder exhibits an ionic conductivity of less than $10^{-5}$ S/cm at room temperature.

Preferably, the glass powder may be provided with D90 particle sizes from 100 nm to 10 µm, more preferably from 150 nm and 5 µm, and most preferably from 250 nm to 1 µm.

Moreover, the glass powder primary grains may be provided in rod-shaped, fibrous, round, oval, polygonal, edged, dumbbell-shaped and/or pyramidal geometries.

Platelets or flakes may also be used. Their preparation may be accomplished by spin processes or tube blowing, for example.

In another advantageous embodiment, the glass powder may be provided locally in a higher volume fraction, so as to protect regions of particular risk, especially regions with expected high current densities, or regions with a higher risk of mechanical damage, such as in the vicinity of external electrical connections or in the area of electrical feedthroughs.

Further mechanical stability may be provided to the cell by sintered glass particles. This allows, for example, to provide an own stability for electrolyte containing regions, so that the cell does not permit short circuits between the anode and the cathode, even if the separator should melt.

Moreover, a sintered body filled with electrolyte may be advantageous in terms of manufacturing technology, since it may then be handled independently, and subsequently electrodes and the separator can be attached to it. In this context, an increased wettability is also of considerable advantage.

Also, internal short circuits are suppressed, because the sintered body allows to permanently ensure that simple direct paths between the anode and the cathode are greatly elongated, and therefore dendrites may only form to a reduced extent.

Then, even in the much less probable case of dendrite formation, the growth thereof and advantageously the avalanche-like growth thereof is successfully suppressed by the components of the sintered body. Not only longitudinal but also lateral growth may only proceed until the next sintered particle and thus remains limited.

However, due to the locally restricted cross-section, currents may no longer rise arbitrarily high. In this case, it is just in the most risky regions where these dendrites having a limited width and thus limited current-carrying capacity, are enclosed by a melt and encapsulated by the desired melting and encapsulation processes that are induced by the heat introduced by their own resistance. In this way, in many cases the dendrite and therefore the current flow therethrough may be interrupted in the melt, in particular by local chemical reactions.

The sintered body may also include glasses having different melting temperatures, preferably in a particulate mixture, in order to define also in this case the ratio of the melting, enveloping constituent to the mechanically stable remaining constituent.

Alternatively or in addition to the higher-melting glass constituents or glass particles, ceramic or crystallic particles may be included in the sintered body, in particular to provide a defined stability even in case of thermal anomalies.

Where mechanically elastic, temperature-stable constituents are desirable, for example in order to alleviate mechanical stresses due to differences in thermal expansion, for example in the separator, it is also possible to use fiber braids or non-woven fiber fabrics from fibers of the glasses described herein, in the entire volume or in portions thereof.

These fiber braids may provide desired mechanical strength and adequate elasticity, predefined by the way of their integration and associated direction.

These fibers may be embedded in the sintered body described above in a particulate mixture or in a defined proportion. In this latter case, even extreme temperature differences will no longer cause fracture or rupture of the sintered body, since its elastic fiber constituents will keep it stable in predefined manner. Although being of a completely different field in terms of patent law, a person skilled in the art may make structural loans from reinforced concrete structures to use tensile-proof with ceramic materials to produce mechanically stable structures, for example.

Generally, however, the component may be the separator, the cathode, the anode, and/or the liquid electrolyte. Furthermore, the preferably multifunctional constituent may also be arranged or realized in functional layers between these components or devices.

Manufacturing may be accomplished using a preferably cost efficient process step of melting at temperatures below 2000° C., preferably below 1700° C., and with rapid cooling.

The multi-functional constituent, in particular in form of a glass powder or glass-ceramic powder, may be arranged in a lithium-ion cell in uniformly distributed manner in the volume of in some or all of the components, and/or in the regions near the surface, or at the surface of some or all of these components.

Advantageously, when producing the batteries or individual battery components, the glass or glass-ceramic powder may be added or applied in form of a slurry which in addition to a glass or glass-ceramics powder having a grain size from less than 1 µm to 50 µm, preferably up to 20 µm, comprises nothing else but water and which is nevertheless stable.

It has been found that it may be particularly useful for the slurry to be adjusted to a weakly acidic pH range. Suitable for this purpose are acids, more preferably monovalent acids such as inorganic acids as nitric acid, $HNO_3$, and hydrochloric acid, HCl, or organic acids such as formic acid and acetic acid. If it is desired to selectively adjust an alkaline pH range, ammonia, $NH_3$, is particularly suitable for this purpose. In case particularly high filling levels of the slurry of more than 40% solids are desired, it may be necessary to use plasticizers. Polymethacrylates are particularly suitable for this purpose.

The settling behavior of such a slurry may furthermore be improved by addition of a rheology agent or thickener. For this purpose, polysaccharides such as celluloses or cellulose derivatives such as ethylcellulose are useful.

The invention will now be described in more detail with reference to preferred embodiments thereof and to the accompanying drawings, wherein.

DETAILED DESCRIPTION OF THE PREFERRED EMBODIMENTS

In the following description and in the claims, all data about glass compositions are given in wt %, unless expressly otherwise stated.

Figure 1:
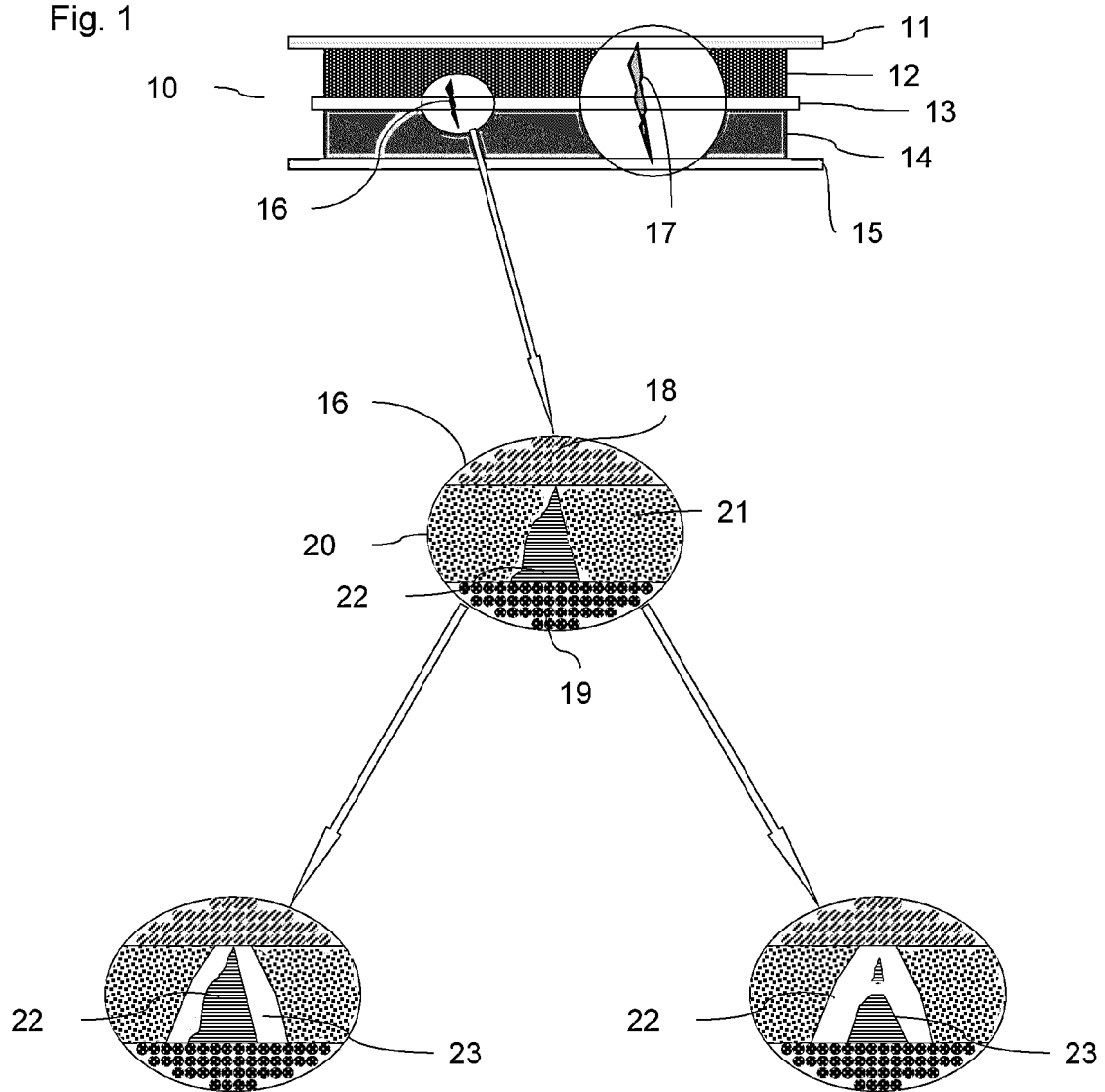
FIG. 1 is a sectional view through a lithium-ion cell 10 illustrating different stages of a thermal anomaly and effects of particulate inorganic constituents provided by the invention.

FIG. 1 shows a section through a lithium-ion cell 10 comprising an aluminum diverter 11, a cathode 12, a separator 13, an anode 14, and a copper diverter 15. Also shown, in the upper portion of the drawing, is a failure 16 which illustrates a short circuit from the anode to the cathode, and a failure 17 which illustrates a short circuit between the two diverter foils 11 and 15.

The middle portion of FIG. 1 shows failure case 16 in more detail. The schematic magnification illustrates cathode material 18, anode material 19, and separator 20 which in turn includes glass particles 21. Also shown is a dendrite of lithium metal 22 which causes the short-circuit and hence the failure.

The lower portion of the drawing illustrates how the system behaves in case of such dendrite formation if glass particles 21 are present. In principle, two ways are possible: In the lower left section, dendrite 22 is enclosed by a glass cladding 23 whereby the heat generated by the short circuit is dissipated only very locally, which ultimately prevents the short circuit.

The lower right section shows that even "truncating" of such a dendrite is possible.

Figure 2:
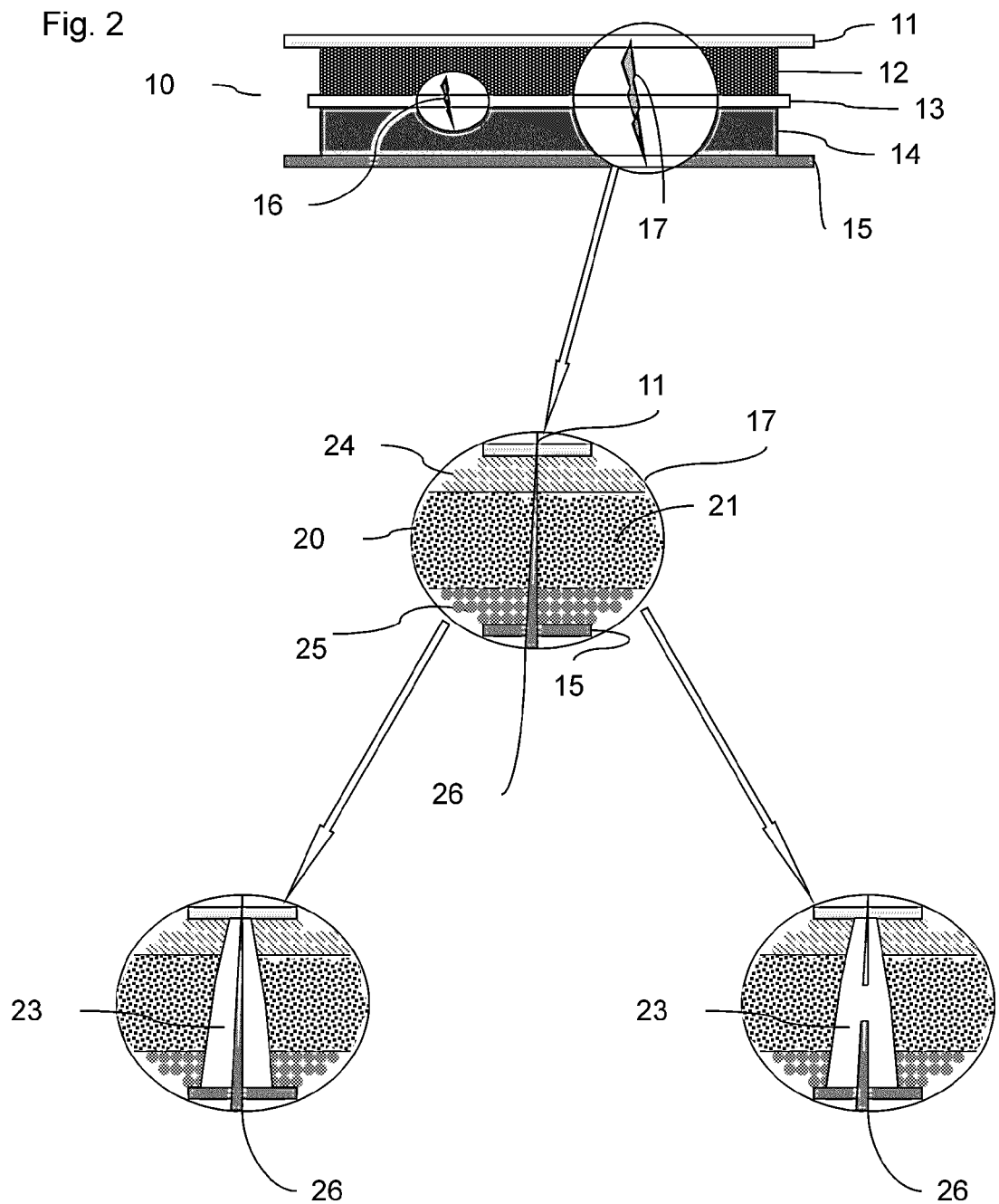
FIG. 2 is another sectional view through a lithium-ion cell 10 illustrating different stages of a thermal anomaly and effects of particulate inorganic constituents provided by the invention.

FIG. 2, in its upper portion, again shows a section through a lithium-ion cell 10 comprising an aluminum diverter 11, a cathode 12, a separator 13, an anode 14, and a copper diverter 15. Also shown, in the upper portion of the drawing, is failure 16 which illustrates a short circuit from the anode to the cathode, and failure 17 which illustrates a short circuit between the two diverter foils 11 and 15.

The middle portion of FIG. 2 shows failure case 17 in more detail. The schematic magnification illustrates cathode material 24 which in this particular embodiment also includes glass material, diverter 11, anode material 25, likewise of a particular embodiment that includes glass material, diverter 15, and separator 20 which again includes glass particles 21. Also shown is a metal splinter 26 which causes the short-circuit and hence the failure. The lower portion of the drawing illustrates how the system behaves in case of such damage if glass particles 21 are present and glass material is incorporated in the anode material 25 and cathode material 24. In principle, two ways are possible: In the lower left section, metal splinter 26 is enclosed by a glass cladding 23 whereby the heat generated by the short circuit is dissipated only very locally, which ultimately prevents the short circuit. The lower right section shows that even "truncating" of such a metal splinter is possible.

Figure 3:
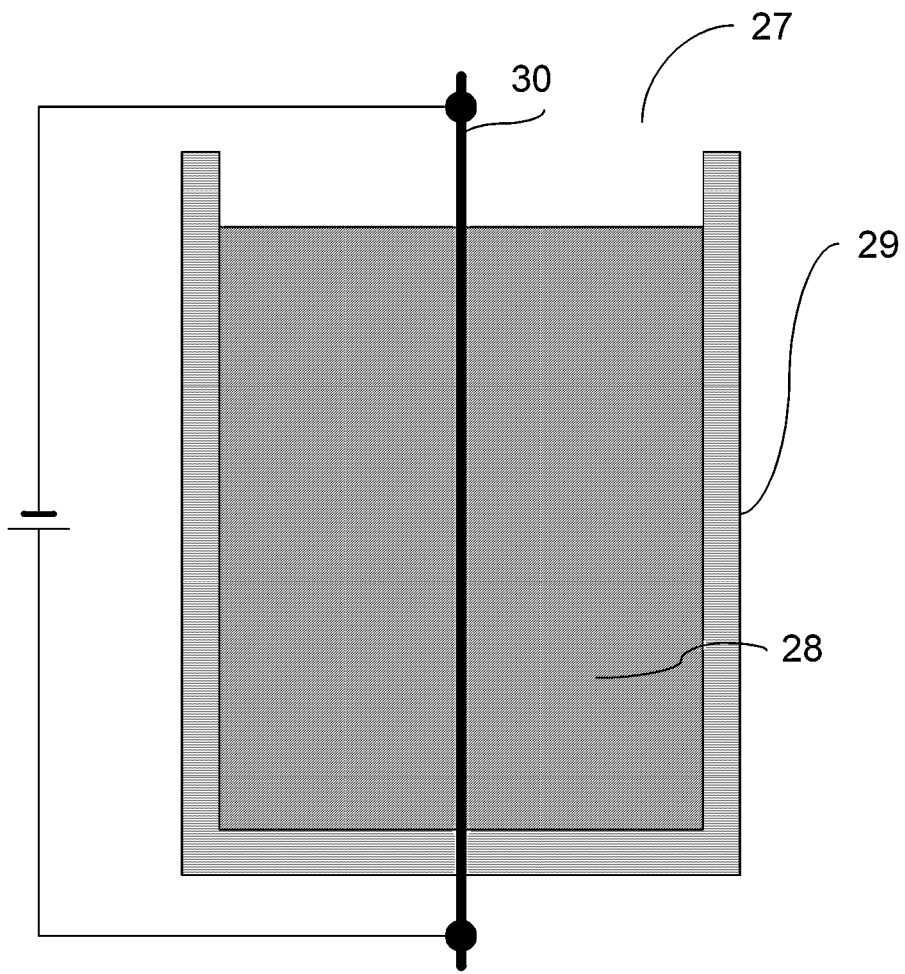
FIG. 3 is a sectional view through a conceptual arrangement 27 for performing melting experiments with different powders under the influence of a current.

FIG. 3 shows a section through a conceptual arrangement 27 for determining the behavior of bulk powder 28 when heated by an electric current. Bulk powder 28 is shown in a container 29, with a wire 30, for example a copper wire, extending through the bulk powder.

Figure 4:
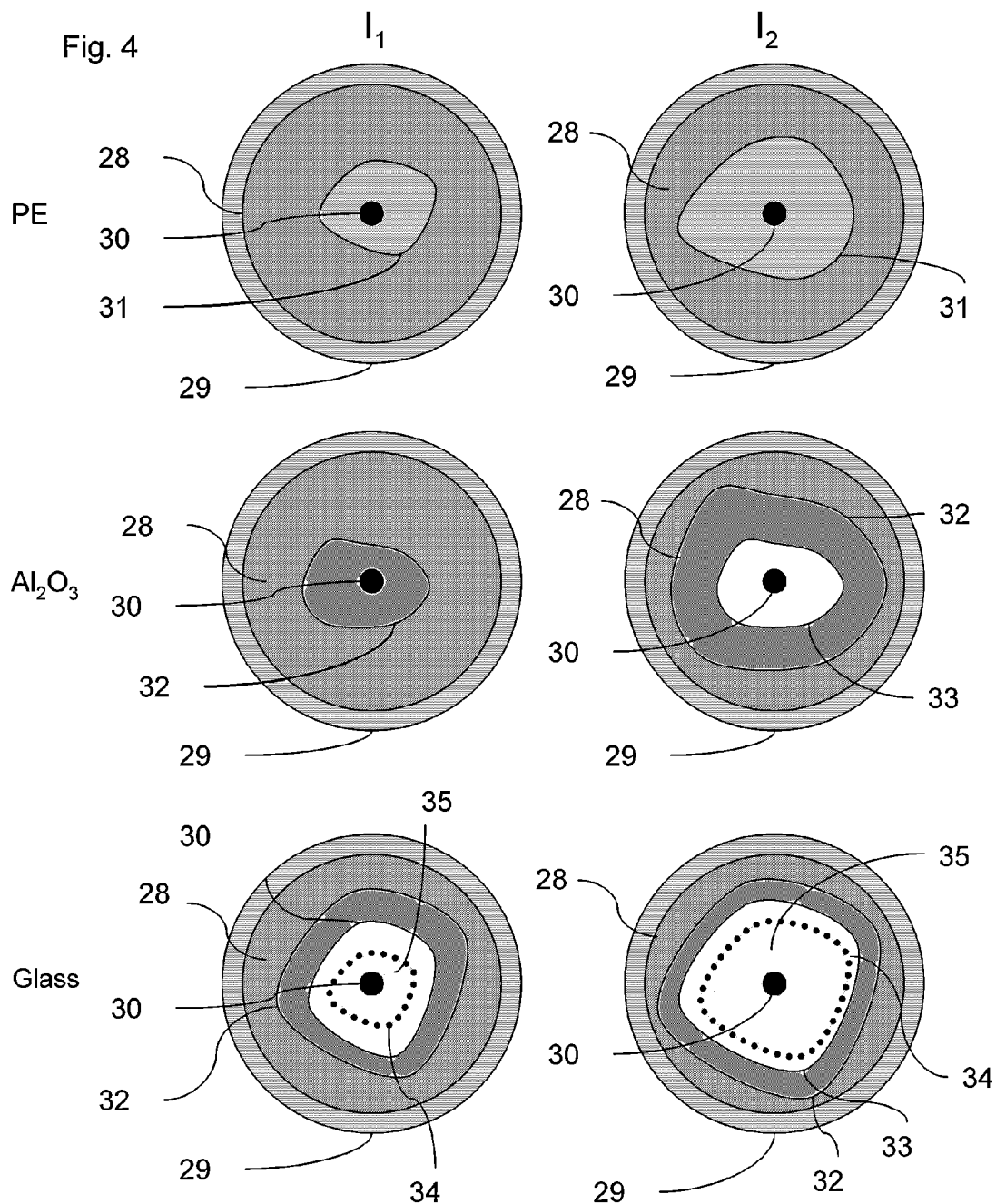
FIG. 4 is a plan view of the principle experiment of FIG. 3, wherein different test materials were used as bulk powder.

FIG. 4 shows a top view of the conceptual arrangement 27 of FIG. 3, with different materials that were used as the powder, and also illustrates the influence of different current levels and thus of different heat inputs into the system.

On the top left, the behavior of a powder at a current $I_1$ can be seen when the powder is made of polyethylene. In addition to the unmodified bulk powder 28 and container 29 and lead wire 30, a zone 31 is clearly recognizable which includes a mixture of molten and especially already decomposed polyethylene. In the illustration at the right thereof it can be seen that at a current $I_2$, with $I_2 > I_1$, the zone of decomposed polyethylene has increased significantly.

In the middle on the left, the behavior of a ceramic material having a high melting point can be seen at a current $I_1$. Here, zone 32 is recognizable in which only slight sintering of the ceramic material has occurred.

At a current $I_2$, two zones can be identified, namely zone 32 with only very loosely sintered material, which has increased significantly as compared to the condition at current $I_1$, and zone 33 with slightly denser sintered material.

The illustration on the lower left shows the behavior of glass particles according to the invention at a current $I_1$. Even this relatively low current results in a formation of a loosely sintered zone 32 and a densely sintered zone 33. Additionally, a melt-sintered zone 34 and a melting zone 35 are already clearly visible. At current $I_2$, the four mentioned zones 32, 33, 34, and 35 are also present, with the melting zone considerably enlarged and the other zones located at a greater distance from the center of container 29 and thus from the current-carrying conductor 30.

An exemplary scenario is a situation in which a metal dendrite, a splinter or the like penetrates the separator of a charged cell in an area smaller than 1 mm×1 mm. This produces an internal short circuit between the anode and the cathode or between the corresponding current diverters.

With an operating voltage of 3.7 V and an assumed current of 100 A, an integral heat of about 400 W results along a very thin cross-section of the connecting bridge. The temperature rises sharply to several hundred ° C., i.e. the temperature will be well above the melting point of PE (130° C.), or that of PP (about 165° C.), which may result in a destruction of the separators.

A separator not provided with inorganic particles, i.e. a pure organic separator, will shrink or burn, resulting in a planar short circuit of the electrodes. Unless the cell does not catch fire, at least it is usually no longer operational.

The use of e.g. crystalline particles with a very high thermal conductivity such as of $Al_2O_3$ implies a rapid dissipation of the resulting heat. Therefore, however, this does not contribute to heat containment.

In contrast, a glass-based material such as glass or glass-ceramics offers many advantages.

1. Due to its low thermal conductivity, the propagation of heat is considerably hindered. The dissipation of heat into the entire cell is more moderately; heat peaks of the same integral amounts are distributed over a longer period, and with lower absolute values relative to the heat of the metal splinter or dendrite causing the short circuit.

For a better understanding of the invention, model calculations were performed, which were based on a simulation model.

This simulation model was implemented mathematically as follows:

The stationary Poisson equation for the electric potential $$\vec{\nabla} \cdot (\sigma \vec{\nabla} U) = 0$$

and the equation of transient heat conduction for a temperature T $$\rho c_p \frac{\partial T}{\partial t} = \vec{\nabla} \cdot (k \vec{\nabla} T) + Q$$

are dissolved in coupled manner, with predefined physical constraints for the electric potential U and temperature T such as present in a battery cell.

Required material parameters are the electrical conductivity $\sigma$, the density $\rho$, the specific heat $c_P$, and the thermal conductivity k of the involved materials. The source term Q of the Joule heat is obtained from the current density j (vector)

$$\vec{j} = -\sigma \vec{\nabla} U$$

as $$Q = \frac{1}{\sigma} \vec{j}^2$$

With this approach, realistic values of heat sources and the temperature distribution in the considered region of the battery are obtained.

In addition to practical tests, which due to the huge number of glasses were not performed for each individual glass, the simulation model evaluated to which extent the temperature profile inside a lithium-ion battery can be influenced by altering the thermal conductivity of the lithium-ion cell infiltrated with particles by replacing well heat-conducting ceramic materials with poorly heat-conducting glass materials.

Due to the low thermal conductivity of glass, heat propagation is considerably hindered and thus the heat is locally restricted. This means that heat propagation is reduced or even prevented if the heat can be transformed locally in other ways, such as for example in local melting processes. Such local melting processes, however, result in a yet stronger local shielding, since internal heating may further increase the viscosity inside, without however bringing the viscosity at the edge of the enclosure to a liquid melt.

Figure 5:
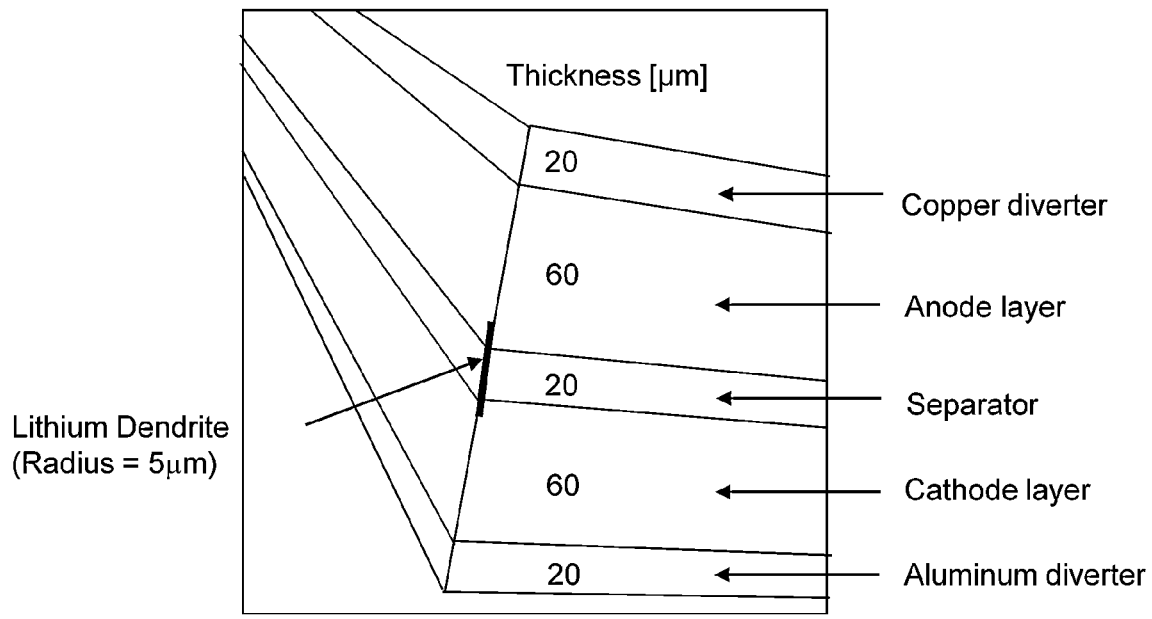
FIG. 5 illustrates the geometry of a lithium-ion cell, showing only one quadrant around the cylindrical lithium dendrite.

FIG. 5 illustrates the geometry of a lithium-ion cell (only one quadrant around the cylindrical lithium dendrite being shown). In this simulation the applied voltage is 3.7 V.

The geometry of the simulation model will now be described: The diverter films of copper (Cu) or aluminum (Al) have a thickness of 20 μm each, inwardly adjacent thereto are respective electrodes with a thickness of 60 μm which are impregnated with electrolyte. A separator of a thickness of 20 μm and likewise impregnated with electrolyte is disposed in the center, which has, by way of a model, a cylindrical dendrite of lithium metal with a radius of 5 μm grown at an edge thereof.

This dendrite causes a short-circuit current between the electrodes, and causes local heating due to the finite electrical conductivities of the adjacent electrodes.

The table below shows data of the materials used for model calculation.

| Material | Density [kg/m³] | Thermal conductivity [W/K · m] | $c_p$ [J/kg · K] | σ [S/m] |
| --- | --- | --- | --- | --- |
| Copper | 8920 | 400 | 381 | 59.8e6 |
| Upper electrolyte (graphite) | 2300 | m07: 110 m08: 55 | 709 | 1000 |
| Separator | 1000 | m07: 1 m08: 0.5 | 1000 | 1e−6 |
| Lithium | 535 | 85 | 3482 | 11.7e6 |
| Lower electrolyte ($LiCoO_2$) | 5000 | m07: 4 m08: 2 | 946 | 1000 |
| Aluminum | 2719 | 202 | 871 | 37.7e6 |

The thermal conductivities between model 07 and model 08 have been halved, in order to better illustrate the effect of the reduced thermal conductivity caused by glass particles as compared to ceramic particles.

The thermal conductivity of a mixture of the added particles together with graphite or $LiCoO_2$ particles and the electrolyte is obtained approximately from the individual thermal conductivities weighted with the respective volume fraction.

If the volume fraction of ceramic particles is high (>50%), the resulting average thermal conductivity is mainly determined by the high thermal conductivity of the crystalline phase.

According to the invention, by replacing the crystalline particles with glass particles (in the broad sense) the average thermal conductivity of the composite will be significantly reduced, due to the poor thermal conductivity of all glasses.

In the table above two variations of thermal conductivity have been used, for mixtures of different composition: m07 (representing ceramic particles), and m08 (representing glass particles).

The figure discussed below illustrates heating over time.

Figure 6:
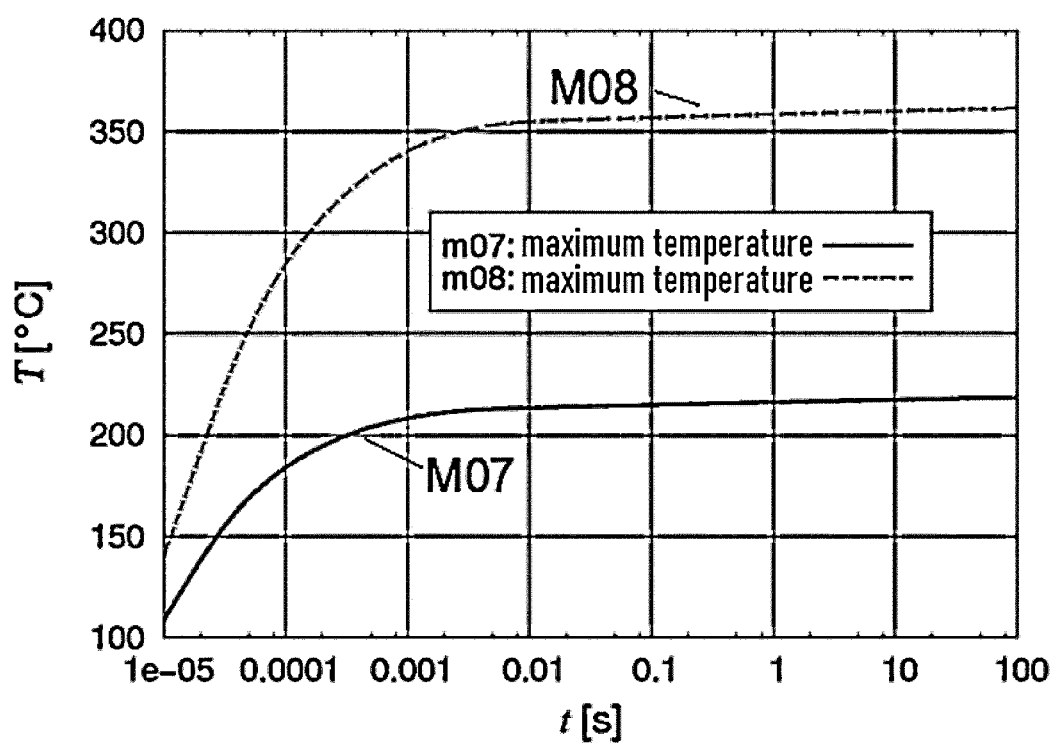
FIG. 6 shows the course of maximum temperature over time, for variation 1 and variation 2.

FIG. 6 shows the time course of the maximum temperature for variation 1 and variation 2 (halved thermal conductivity).

It is clearly seen that the temperature for the variation with lower thermal conductivity (m08) rises faster and reaches significantly higher temperatures.

Figure 7:
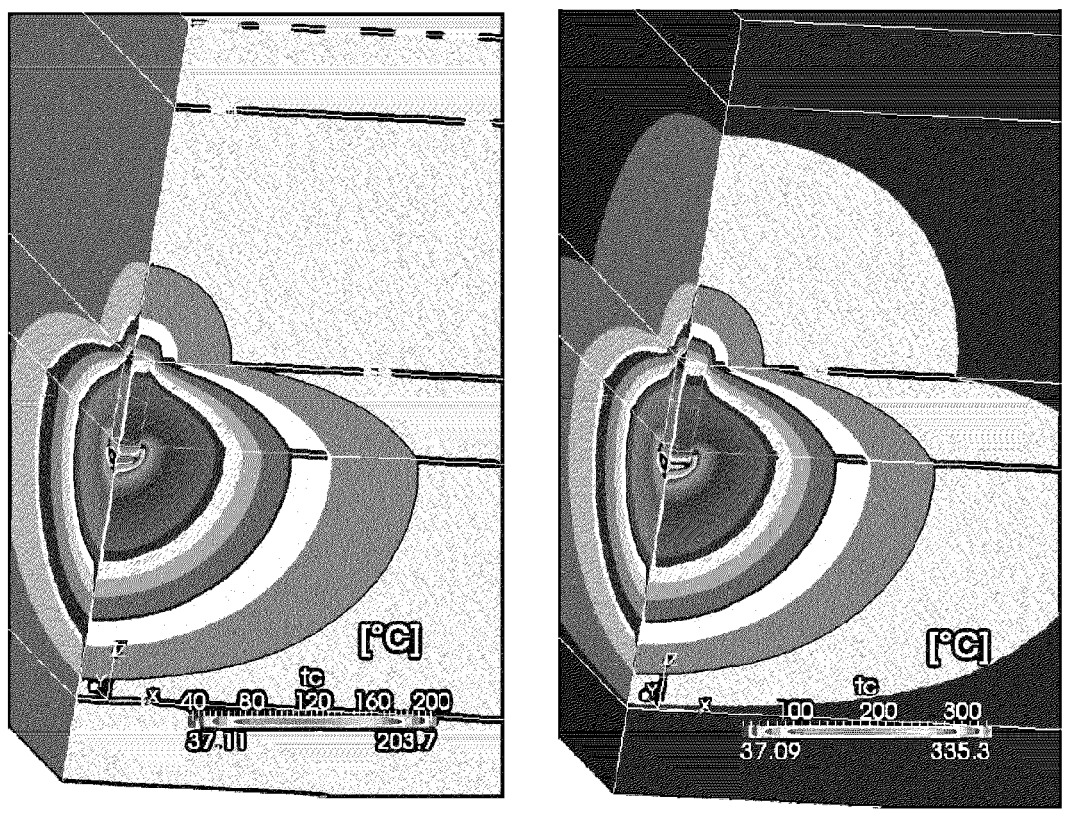
FIG. 7 illustrates a quasi-stationary temperature field in the region of the lithium dendrite, wherein in the left image, with good thermal conductivity, the maximum temperature reaches about 204° C., while in the case of poorer thermal conductivity, such as shown in the right image, it may reach about 340° C.

FIG. 7 shows a quasi-stationary temperature field in the vicinity of the lithium dendrite. In the left image, with good thermal conductivity, the maximum temperature reaches about 204° C., while in the case of poorer thermal conductivity such as shown in the right image, a maximum temperature of about 340° C. is reached.

Although in the left image the temperature is sufficient to cause decomposition of organic components, it does not allow the hot zone to be "encapsulated".

By lowering the thermal conductivity, such as shown in the right image, in combination with a softening but not decomposing glass with a very poor electrical conductivity, electrical encapsulation of the dendrite zone is achieved.

According to the invention, the short-term local temperature increase is desirable in order to facilitate the melting of the glass particles. Preferably, the thermal anomaly may be separated and/or locally restricted immediately during melting, and may in particular be separated and/or locally restricted by surrounding and/or enclosing the thermal anomaly by melted material. Advantageously, in a further step which however is not illustrated in these model calculations, this abnormal temperature behavior and hence this thermal anomaly may be extinguished by interrupting the contact by embedding the critical hot zone in a glass, or at least the negative effects thereof may be separated and/or locally restricted and thus mitigated.

In this way, protection of the lithium-ion cell is achieved because despite short term local temperature peaks, average temperatures can be kept at lower absolute values over a longer period.

A thermal breakdown or collapse, also referred to as thermal runaway, thus becomes much less likely.

Preferably, the glass even encapsulates a hot spot. With proper adjustment of the viscosity of the glass-based material to the temperature regimes of the hot spot, the glass preferably sinters densely or possibly even melts. Once cooled down, the regulus then has enclosed this hot spot thus limiting the damage.

2. In another embodiment, the developing melt or melt interphase reacted chemically with the metallic particle, thus truncating the short-circuit causing connection.
3. In yet another embodiment, alloy formation occurred during melting, preferably at the cathode side, for example between the Si of the glass and the cathode material, due to local electrolysis of the glass. This also contributes to increase the resistance to thermal runaway.

Decisive for any of the effects is that at the moment the internal short circuit ISC occurs, the existing low-resistance junction is transformed into a high-resistance junction.

$Al_2O_3$ and other simple crystalline substances are incapable to provide for the above: neither are they densely sintered or melt below 1000° C. within short periods, nor are they suitably chemically reactive.

Another advantage of glass is its chemical variability. By suitably varying the compositions, viscosities, melting points, etc. may be adjusted.

So, depending on the integration site of the particulate glass, the viscoelastic properties thereof may be adjusted accordingly.

Also, several types of glass, for example such of low and such of high viscosity, may be included into the separator or electrode composite, for example, as a mixture.

Another advantage of certain glasses, glass-ceramics, phase-demixed glasses, and other glass-based materials is their comparatively low density. For the same volume fraction of added inorganic particles, a specifically lighter material such as glass is clearly preferable over $Al_2O_3$ ($Al_2O_3$ density about 3.5 to 4 g/cc).

The glass may be included in various shapes, sizes, etc. The glass may be provided as a powder, rod-shaped or fiber-shaped, either homogeneously or with a core/shell structure of the individual grains. The particles may be agglomerated or fused. The glasses may be porous or may have a selective surface texture. The glass particles may be silanized at the surface.

The particulate glass/glass-ceramics may be integrated in or at the separator/anode/cathode/electrolyte.

By way of example, the volume fraction of the glass is from 0.001 to 90% by volume.

Decisive for the effectiveness of the powder of glass-based material is specific surface area thereof.

Upwardly, values of up to 50 sqm/g, if not even more than 100 sqm/g are useful. The lower limit is at 1 sqm/g, preferably not less than 2 sqm/g.

Preferably, the glasses/glass-ceramics accomplish at least one further active additional function. The additional function may relate to the application thereof, but also to the manufacturing of the cell or of components thereof.

Due to its thermal stability and inertness, the material may at least be employed as a spacer (or at least as a part of the spacer in combination with other constituents of the separator or of an electrode layer) between the cathode and the anode of lithium-ion cells. However, the application thereof may also be extended to any other components (anode, cathode, electrolyte, packaging).

By way of example, the following additional features are provided according to the invention:
  gettering effect, e.g. to HF;
  dielectric properties, and thereby indirectly/directly caused increase of ionic conductivity of a liquid electrolyte.

Exemplary Embodiments:

In the present disclosure, the term "glass" defines a material having the following properties:
  The material comprises a glass, a glass-ceramic, or a composite thereof, in the technical sense.
  The material may be intrinsically homogeneous, or may comprise a phase-demixed glass or a glass-ceramic prepared by phase separation.
  Materials useful for the present invention comprise monolithic or porous materials.
  The constituents of the material are substantially oxidic. Small non-oxide anion dopings may exist.
  The material is particulate, and the grain shape may be diverse, such as e.g. spherical, edged, oval, flake-like, fibrous, of a core/shell type, or surface-textured.

A glass of the composition described above and with the properties described above was melted in a continuous or batch melting process, in a furnace and/or a suitable crucible, under air and at more than 1500° C., the melt was rapidly cooled down, and the pieces were transformed into a powder by grinding.

Alternatively, such particles may also be prepared by a sol-gel process. For this purpose, a sol of the alkoxides of the corresponding elements or similar compounds which, like the alkoxides, easily perform crosslinking reactions by hydrolysis and condensation reactions, is produced.

Pure inorganic sol-gel processes or mixed organic-inorganic sol-gel routes may also be employed.

The resulting colloidal solution is treated by suitable measures to cause gelation of the sol, such as for example an adjustment of the pH or addition of water.

Alternatively, the sol may be subjected to spray drying.

The thus formed solid which is composed of particles, may then be subjected to a calcination reaction, in order to remove organic impurities, if necessary. In this way, often nanoparticles of the corresponding material are obtained.

The glass particles are introduced for example in liquid electrolytes, with sizes of a few μm (<150 μm), preferably smaller than 25 μm and <5 μm, or even as nanoscale powders (>100 nm). Due to the high dielectric constant, the dissociation of the conductive salt $LiPF_6$ is increased, or the solvation shell is modified, with the advantage of an increased ionic conductivity of the whole liquid electrolyte system.

Alternatively, the powder is incorporated into a separator composite. Powders of the glass according to the invention of the grain fraction are intimately mixed as a slurry together with binders, polymer monomers, and are selectively applied to a separator membrane or a polymer nonwoven.

Advantageously, the glass particles do not only accomplish the function of a spacer in the event of thermal runaway, but also locally accomplish the function of increasing the ionic conductivity of the liquid electrolyte.

In a specific embodiment, the glass powders are a constituent of an anode composite or a cathode composite. The latter usually distinguishes by a porous structure of electrochemically active storage materials and pores.

The pores may have sizes of up to 20 μm and are impregnated with the liquid electrolyte. The pores may then be filled by the glass powder, at least partially. If the powder increases ionic conductivity, as according to the invention, the electrode may be packed more densely, which results in an increase of the specific capacity of the electrode.

Alternatively to the above-mentioned glass, a glass-ceramic may be used which comprises $BaTiO_3$ as a dielectric crystal phase. The dielectric constant epsilon thereof is 5000, preferably up to 10,000, more preferably up to 15,000, due to the crystallite size (in the order of the ferroelectric domains or below). However, conventional glasses with dielectric constants from 5 to 20 are also effective in terms of a better dissociation of the conductive salt, or for intercepting the electrolyte anion.

In another embodiment, instead of the glass described above a glass is used which adsorbs the adverse HF in the cell or permanently binds it through surface or volume reactions.

The glass particles are preferably provided with particle sizes from 100 nm to 10 μm, preferably from 150 nm to 5 μm, and more preferably from 250 nm to 1 μm, and have either round, spherical, oval, or angular shapes, and have been prepared by grinding. Alternatively, fine powders may also be prepared through the proper manufacturing process (e.g. sol-gel, flame spray pyrolysis, chemical precipitation). Similar as mentioned above, the particles are either slurried or coated onto/into the separator, or embedded in the electrode composite or coated thereon.

According to the invention, a component composite (separator or electrode) including a glass fraction is advantageous to prevent/delay thermal runaway, i.e. a self-ignition of a lithium-ion cell, for example in case of an internal local short circuit. If, for example by external influence (pressure, penetration of an object) or by internal processes (such as dendrite growth), the separator is locally pierced, the heating locally arising at the short circuit site cannot or only hardly spread over the entire cell. The produced heat is kept localized, or is encapsulated in the poorly heat-conductive composite.

The cell remains safe, despite possible efficiency losses.

According to variation 1, for example, a glass of the composition of example 12 in table 2, $SiO_2$ (7), and of a thermal conductivity of 1.1 W/(m·K) is incorporated into the electrode composite in form of particles of a size as described above.

In another embodiment, the glass is selected such that it locally melts at the site of the internal short circuit. This produces a lubricating film which prevents further spread of the thermal spot.

Due to their low thermal conductivity, glass particles help to further level the differences in thermal conductivity in the axial and radial cell directions, which in current round cells differ by a factor of 10 or more, for example.

In another embodiment, a layer or phase composite is produced in the separator or electrode region, which carries or comprises a glass as a functional additive.

The glass advantageously exhibits a very good wettability to liquid electrolyte. Therefore, the manufacturing process is facilitated as compared to an additive-free component.

Moreover, the glass including components exhibit a better resistance to higher operating voltages.

Exemplary Glass Families Include:
Silicate glasses, e.g. $SiO_2$—$B_2O_3$ glasses, more preferably glasses including $Li_2O$—$B_2O_3$ and $SiO_2$;
Phosphate glasses, e.g. with more than 70 mass % of $P_2O_5$, more preferably with more than 80 mass % of $P_2O_5$;
Borate glasses, e.g. boro-phospho silicate glasses, or glasses of the $B_2O_3$—$Al_2O_3$—RO system, with R=Mg, Ca;
Aluminate glasses, e.g. of the $Al_2O_3$—$B_2O_3$—RO system, with R=Mg, Ca.

In addition, exemplary glass compositions are given in Table 1 below.

TABLE 1 glasses for use in lithium-ion cells (data in wt %)

| | Min | Max |
|---|---|---|
| | | Silicatic Glass |
| $SiO_2$ | 45 | 100 |
| $TiO_2$ | 0 | 10 |
| $ZrO_2$ | 0 | 10 |
| $Al_2O_3$ | 0 | 42 |
| $B_2O_3$ | 0 | 30 |
| $Fe_2O_3$ | 0 | 0.5 |
| $P_2O_5$ | 0 | 10 |
| MgO | 0 | 20 |
| CaO | 0 | 20 |
| BaO | 0 | 20 |
| MnO | 0 | 20 |
| ZnO | 0 | 10 |
| $Li_2O$ | 0 | 50 |

TABLE 1-continued glasses for use in lithium-ion cells (data in wt %)

|  | Min | Max |
|---|---|---|
| Na$_2$O | 0 | 10 |
| K$_2$O | 0 | 10 |
| La$_2$O$_3$ | 0 | 10 |
| SrO | 0 | 10 |
| Halogen (elementary) | 0 | 20 |
| As$_2$O$_3$ | 0 | 1.5 |
| Sb$_2$O$_3$ | 0 | 1.5 |
| Cs$_2$O | 0 | 10 |
| Nb$_2$O$_3$ | 0 | 40 |
| RE (except La$_2$O$_3$) | 0 | 5 |
| SnO$_2$ | 0 | 1.5 |
| NiO | 0 | 20 |
| CoO | 0 | 20 |
| Ta$_2$O$_5$ | 0 | 25 |
| SnO | 0 | 1.5 |
| SrO | 0 | 20 |
| and | | |
| Phosphate Glass A | | |
| SiO$_2$ | 0 | 30 |
| TiO$_2$ | 0 | 40 |
| ZrO$_2$ | 0 | 10 |
| Al$_2$O$_3$ | 0 | 30 |
| B$_2$O$_3$ | 0 | 30 |
| Fe$_2$O$_3$ | 0 | 0.5 |
| P$_2$O$_5$ | 20 | 100 |
| MgO | 0 | 20 |
| CaO | 0 | 20 |
| BaO | 0 | 20 |
| MnO | 0 | 20 |
| ZnO | 0 | 10 |
| Li$_2$O | 0 | 50 |
| Na$_2$O | 0 | 10 |
| K$_2$O | 0 | 10 |
| La$_2$O$_3$ | 0 | 10 |
| SrO | 0 | 10 |
| Halogen (elementary) | 0 | 35 |
| As$_2$O$_3$ | 0 | 1.5 |
| Sb$_2$O$_3$ | 0 | 1.5 |
| Cs$_2$O | 0 | 10 |
| Nb$_2$O$_3$ | 0 | 40 |
| RE (except La$_2$O$_3$) | 0 | 5 |
| SnO$_2$ | 0 | 1.5 |
| NiO | 0 | 20 |
| CoO | 0 | 20 |
| Ta$_2$O$_5$ | 0 | 10 |
| SnO | 0 | 65 |
| SrO | 0 | 20 |
| and | | |
| Phosphate Glass B | | |
| SiO$_2$ | 0 | 30 |
| TiO$_2$ | 0 | 40 |
| ZrO$_2$ | 0 | 10 |
| Al$_2$O$_3$ | 0 | 30 |
| B$_2$O$_3$ | 0 | 30 |
| Fe$_2$O$_3$ | 0 | 7.5 |
| P$_2$O$_5$ | 20 | 100 |
| MgO | 0 | 20 |
| CaO | 0 | 20 |
| BaO | 0 | 20 |
| MnO | 0 | 20 |
| ZnO | 0 | 20 |
| Li$_2$O | 0 | 50 |
| Na$_2$O | 0 | 35 |
| K$_2$O | 0 | 30 |
| La$_2$O$_3$ | 0 | 10 |
| SrO | 0 | 10 |
| Halogen (elementary) | 0 | 35 |
| As$_2$O$_3$ | 0 | 1.5 |
| Sb$_2$O$_3$ | 0 | 1.5 |
| Cs$_2$O | 0 | 10 |
| Nb$_2$O$_3$ | 0 | 40 |
| RE (except La$_2$O$_3$) | 0 | 5 |
| SnO$_2$ | 0 | 1.5 |
| NiO | 0 | 20 |
| CoO | 0 | 20 |
| Ta$_2$O$_5$ | 0 | 20 |
| SnO | 0 | 30 |
| SrO | 0 | 5 |
| CuO | 0 | 20 |
| Bi$_2$O$_3$ | 0 | 30 |
| Sb$_2$O$_5$ | 0 | 5 |
| and | | |
| Borate Glass | | |
| SiO$_2$ | 0 | 30 |
| TiO$_2$ | 0 | 10 |
| ZrO$_2$ | 0 | 10 |
| Al$_2$O$_3$ | 0 | 30 |
| B$_2$O$_3$ | 20 | 100 |
| Fe$_2$O$_3$ | 0 | 0.5 |
| P$_2$O$_5$ | 0 | 10 |
| MgO | 0 | 20 |
| CaO | 0 | 20 |
| BaO | 0 | 20 |
| MnO | 0 | 20 |
| ZnO | 0 | 10 |
| Li$_2$O | 0 | 50 |
| Na$_2$O | 0 | 10 |
| K$_2$O | 0 | 10 |
| La$_2$O$_3$ | 0 | 50 |
| SrO | 0 | 10 |
| Halogen (elementary) | 0 | 20 |
| As$_2$O$_3$ | 0 | 1.5 |
| Sb$_2$O$_3$ | 0 | 1.5 |
| Cs$_2$O | 0 | 10 |
| Nb$_2$O$_3$ | 0 | 40 |
| RE (except La$_2$O$_3$) | 0 | 5 |
| SnO$_2$ | 0 | 1.5 |
| NiO | 0 | 20 |
| CoO | 0 | 20 |
| Ta$_2$O$_5$ | 0 | 10 |
| SnO | 0 | 1.5 |
| SrO | 0 | 20 |
| and | | |
| Aluminate Glass | | |
| SiO$_2$ | 0 | 30 |
| TiO$_2$ | 0 | 10 |
| ZrO$_2$ | 0 | 10 |
| Al$_2$O$_3$ | 25 | 100 |
| B$_2$O$_3$ | 0 | 30 |
| Fe$_2$O$_3$ | 0 | 0.5 |
| P$_2$O$_5$ | 0 | 10 |
| MgO | 0 | 20 |
| CaO | 0 | 20 |
| BaO | 0 | 20 |
| MnO | 0 | 20 |
| ZnO | 0 | 10 |
| Li$_2$O | 0 | 50 |
| Na$_2$O | 0 | 10 |
| K$_2$O | 0 | 10 |
| La$_2$O$_3$ | 0 | 10 |
| SrO | 0 | 10 |
| Halogen (elementary) | 0 | 20 |
| As$_2$O$_3$ | 0 | 1.5 |
| Sb$_2$O$_3$ | 0 | 1.5 |
| Cs$_2$O | 0 | 10 |
| Nb$_2$O$_3$ | 0 | 40 |
| RE (except La$_2$O$_3$) | 0 | 5 |
| SnO$_2$ | 0 | 1.5 |
| NiO | 0 | 20 |
| CoO | 0 | 20 |
| Ta$_2$O$_5$ | 0 | 10 |
| SnO | 0 | 1.5 |
| SrO | 0 | 20 | wherein the above glasses may preferably also be used in combination, in particulate mixtures with preferred mixing ratios, for example to adjust defined viscosities for specific temperature ranges.

In this way, earlier melting fractions which surround or encapsulate a hot spot, may be combined in defined manner with thermally stable constituents which despite of melting fractions still provide sufficient mechanical stability in order to avoid, in any case, a mechanical collapse of the cell with a possibly extensive short circuit between anode and cathode.

Furthermore, the following glasses of examples 1 to 14 listed in table 2 are advantageously used for variation 1.

TABLE 2

Advantageous embodiments of specific glasses for use in lithium-ion cells (in wt %) according to variation 1

Example 1

| Type | Silicate glass (1) |
|---|---|
| $SiO_2$ | 100 |
| $TiO_2$ | |
| $ZrO_2$ | |
| $Al_2O_3$ | |
| $B_2O_3$ | |
| $Fe_2O_3$ | |
| $Cr_2O_3$ | |
| $P_2O_5$ | |
| MgO | |
| CaO | |
| BaO | |
| MnO | |
| ZnO | |
| PbO | |
| $Li_2O$ | |
| $Na_2O$ | |
| $K_2O$ | |
| $La_2O_3$ | |
| SrO | |
| F | |
| $As_2O_3$ | |
| $Sb_2O_3$ | |
| $MoO_3$ | |
| $Nd_2O_3$ | |
| SrO | |
| $Cs_2O$ | |
| $Nb_2O_3$ | |
| $Y_2O_3$ | |
| $a * b * c\ [s * K^2/m^2]$ | 2772.8 |

Examples 2, 3, 4, 5, and 6

| Type | Aluminate glass (1) | Aluminate glass (2) | Silicate glass (2) | Borate glass (1) | Phosphate glass (1) |
|---|---|---|---|---|---|
| $SiO_2$ | | | 64 | 20 | |
| $TiO_2$ | | 30.00 | | | |
| $ZrO_2$ | | | | | |
| $Al_2O_3$ | 90.00 | 5.00 | 3.5 | 15 | |
| $B_2O_3$ | | | 4.5 | 25 | |
| $Fe_2O_3$ | | | | | |
| $Cr_2O_3$ | | | | | |
| $P_2O_5$ | | 60.00 | | | 35 |
| MgO | | | | | |
| CaO | | | 2 | 10 | |
| BaO | | | 12.5 | 15 | |
| MnO | | | | | |
| ZnO | | | 0.5 | | 5 |
| PbO | | | | | |
| $Li_2O$ | 10.00 | 5.00 | | 3 | |
| $Na_2O$ | | | 6.5 | 2 | |
| $K_2O$ | | | 6.5 | 10 | |
| SnO | | | | | 60 |
| $a * b * c\ [s \cdot K^2/m^2]$ | | | | 240 | 70 |

TABLE 2-continued

Advantageous embodiments of specific glasses for use in lithium-ion cells (in wt %) according to variation 1

Example 7

| Type | Aluminate glass (3) |
|---|---|
| $Al_2O_3$ | 25 |
| $B_2O_3$ | 45 |
| MgO | 15 |
| CaO | 15 |
| $a * b * c\ [s \cdot K^2/m^2]$ | 325.7 |

Example 8

| Type | Silicate glass (4) |
|---|---|
| $SiO_2$ | 55 |
| $TiO_2$ | 2 |
| $ZrO_2$ | 1 |
| $Al_2O_3$ | 30 |
| $P_2O_5$ | 5 |
| MgO | 1 |
| ZnO | 1 |
| $Li_2O$ | 4 |
| $K_2O$ | 0.5 |
| $As_2O_3$ | 0.5 |

Example 9

| Type | Silicate glass (5) |
|---|---|
| $SiO_2$ | 60 |
| $TiO_2$ | |
| $ZrO_2$ | |
| $Al_2O_3$ | 17 |
| $B_2O_3$ | 7 |
| $Fe_2O_3$ | |
| $Cr_2O_3$ | |
| $P_2O_5$ | |
| MgO | 2 |
| CaO | 10 |
| BaO | 3.5 |
| MnO | |
| ZnO | |
| PbO | |
| $Li_2O$ | |
| $Na_2O$ | |
| $K_2O$ | |
| $La_2O_3$ | |
| SrO | |
| F | |
| $As_2O_3$ | |
| $Sb_2O_3$ | |
| $MoO_3$ | |
| $Nd_2O_3$ | |
| $Cs_2O$ | |
| $Nb_2O_3$ | |
| $Y_2O_3$ | |
| $Gd_2O_3$ | |
| $SnO_2$ | 0.5 |
| CoO | |
| $a * b * c\ [s \cdot K^2/m^2]$ | 715.0 |

Examples 10, 11, 12, and 13

| Type | Silicate glass (5) | Silicate glass (6) | Phosphate glass (2) | Silicate glass (7) | Silicate glass (8) | Phosphate glass (3) |
|---|---|---|---|---|---|---|
| $SiO_2$ | 60 | 47 | 1 | 60 | 75 | |
| $TiO_2$ | | | | | 0.5 | |
| $ZrO_2$ | | | | 1 | | |
| $Al_2O_3$ | 17 | 20 | 4 | 16.5 | 5 | 13 |
| $B_2O_3$ | 7 | 7 | 1 | 0.5 | 10 | |
| $Fe_2O_3$ | | | | | 0.5 | 7 |
| $Cr_2O_3$ | | | | | | |
| $P_2O_5$ | | | 70 | | | 70 |

TABLE 2-continued

Advantageous embodiments of specific glasses for use in lithium-ion cells (in wt %) according to variation 1

| | | | | | |
|---|---|---|---|---|---|
| MgO | 2 | 7 | 1 | | 0.5 |
| CaO | 10 | 10 | 3.5 | 15 | 1 |
| BaO | 3.5 | | 10 | 7 | 0.5 |
| MnO | | | | | |
| ZnO | | | 5 | | |
| PbO | | | | | |
| $Li_2O$ | | | | | |
| $Na_2O$ | | | 0.5 | 5.5 | 10 |
| $K_2O$ | | | 2 | 0.5 | |
| $La_2O_3$ | | 2.5 | | | |
| SrO | | 6 | | | |
| F | | | | | 0.5 |
| $As_2O_3$ | | | | | 0.5 |
| $SnO_2$ | 0.5 | | | | |
| $Ni_2O_3$ | | | | | |
| NiO | | | 1 | | |
| $Co_2O_3$ | | | | | |
| CoO | | 0.5 | 1 | | |
| a * b * c [s · $K^2/m^2$] | | | 289 | | 102 |

Example 14

| Type | Silicate glass (9) |
|---|---|
| $SiO_2$ | 55 |
| $TiO_2$ | |
| $ZrO_2$ | |
| $Al_2O_3$ | 10 |
| $B_2O_3$ | 10 |
| $Fe_2O_3$ | |
| $Cr_2O_3$ | |
| $P_2O_5$ | |
| MgO | |
| CaO | |
| BaO | 25 |
| MnO | |
| ZnO | |
| PbO | |
| $Li_2O$ | |
| $Na_2O$ | |
| $K_2O$ | |
| $La_2O_3$ | |
| SrO | |
| F | |
| $As_2O_3$ | |
| $Sb_2O_3$ | |
| $MoO_3$ | |
| $Nd_2O_3$ | |
| SrO | |
| $Cs_2O$ | |
| $Nb_2O_3$ | |
| $Y_2O_3$ | |
| a * b * c [s · $K^2/m^2$] | 718 |

For variation 1, most preferably glasses are selected with a*b*c of more than $100\times10^8$ s·$K^2/m^2$, or, even better, of $200\times10^8$ s·$K^2/m^2$. In case of internal short circuits with an associated high local temperature development, these glasses according to the invention can stay dimensionally stable, and sinter and melt only relatively slowly, if at all.

For variation 2, preferably, glasses are selected with a/(b*c) of more than 80 s/($K^2$·$m^2$), or even better of more than 100 s/($K^2$·$m^2$). According to the invention, these glasses may rapidly deform or even tend to melt/begin to melt already in case of internal short circuits with low temperature development.

Exemplary embodiments of such glasses are listed in table 3 below.

TABLE 3

Other preferred glasses for use in lithium-ion cells (data in wt %) according to variation 2

| Type | Borate Glass (1) | Phosphate Glass (1) | Aluminate Glass (1) | Silicate Glass (1) | Phosphate Glass (2) |
|---|---|---|---|---|---|
| $SiO_2$ | 20 | | | 60 | 1 |
| $TiO_2$ | | | | | |
| $ZrO_2$ | | | | | |
| $Al_2O_3$ | 15 | | 25 | 17 | 4 |
| $B_2O_3$ | 25 | | 45 | 7 | 1 |
| $Fe_2O_3$ | | | | | |
| $Cr_2O_3$ | | | | | |
| $P_2O_5$ | | 35 | | | 70 |
| MgO | | | 15 | 2 | 1 |
| CaO | 10 | | 15 | 10 | 3.5 |
| BaO | 15 | | | 3.5 | 10 |
| MnO | | | | | |
| ZnO | | 5 | | | 5 |
| PbO | | | | | |
| $Li_2O$ | 3 | | | | |
| $Na_2O$ | 2 | | | | 0.5 |
| $K_2O$ | 10 | | | | 2 |
| SnO | | 60 | | | |
| $SnO_2$ | | | | 0.5 | |
| NiO | | | | | 1 |
| CoO | | | | | 1 |
| a/(b * c) [s/($K^2$·$m^2$)] | 99 | 780 | 116 | 42 | 139 | or

| Type | Phosphate Glass (3) | Phosphate Glass (4) | Phosphate Glass (5) | Phosphate Glass (6) | Phosphate Glass (7) |
|---|---|---|---|---|---|
| $SiO_2$ | | | | 0.9 | |
| $TiO_2$ | | 0.5 | | | |
| $ZrO_2$ | | | | | |
| $Al_2O_3$ | | 1.5 | 0.9 | 5.6 | 12.7 |
| $B_2O_3$ | | | | | |
| $Fe_2O_3$ | | | | | 6.6 |
| $Cr_2O_3$ | | | | | |
| $P_2O_5$ | 59.3 | 58.0 | 81.5 | 65.3 | 70.4 |
| MgO | | | 0.9 | | |
| CaO | | | | | |
| SrO | | | 2.7 | | |
| BaO | | | 1.4 | | |
| MnO | | | | | |
| ZnO | | 16.0 | 7.0 | | |
| PbO | | | | | |
| $Li_2O$ | | 0.5 | 5.15 | | |
| $Na_2O$ | 32.4 | 1.5 | | | 10.3 |
| $K_2O$ | | 1.5 | 0.2 | 28.2 | |
| CuO | 8.3 | | | | |
| $Bi_2O_3$ | | 19.5 | | | |
| $Sb_2O_3$ | | | 0.25 | | |
| $SnO_2$ | | 1.0 | | | |
| a/(b * c) [s/($K^2$·$m^2$)] | 702 | 288 | 494 | 1085 | 393 |

Furthermore, ceramics or crystalline bodies may be used as temperature-stable constituents, for example:
  Oxides such as $Al_2O_3$, $SiO_2$, perovskites, spinels, niobates, tantalates, crystalline ion conductors such as $Li_{1.3}Al_{0.3}Ti_{1.7}(PO_4)_3$, or others;
  Carbides such as e.g. WC, $B_4C_3$, or others;
  Nitrides such as e.g. $Si_3N_4$, or others.
Preferred Mixing Ratios Herein are:
  from 0 to 95 vol % of ceramics.

According the present invention, advantageously, the glass or glass-ceramic in the liquid electrolyte is particularly stable, especially in $LiPF_6$ including electrolytes, chemically stable meaning that in particular during a one-week storage of the glass powder in the electrolyte solution at 60° C., not more than 1 mass % of the glass-based material is dissolved, preferably not more than 0.5 mass %, and most preferably not more than 0.1 mass % is dissolved.

Furthermore, advantageously, the glass/glass-ceramic powder exhibits dielectric properties and in particular has a dielectric constant $\in_r$ ranging from 3 to 25,000, preferably from 5 to 20,000.

Moreover, during manufacturing or in the production of the battery cells, also referred to as accumulator or rechargeable battery cell, advantageously, the glass or glass-ceramic powder is added or applied to the cell, or to individual components of the cell of the battery pack, or to individual battery components in form of a slurry which in addition to a glass or glass-ceramic powder having a grain size from less than 1 µm up to 50 µm, preferably up to 20 µm, comprises nothing else but water and which is nevertheless stable.

The glass or glass-ceramic powder, during manufacturing of the cell or of individual components of the cell, may be added or applied in the form of a slurry which in addition to a glass or glass-ceramic powder having a grain size from less than 1 µm up to 50 µm, preferably up to 20 µm, comprises an aqueous or organic liquid, and additives which selectively modify the stability of the slurry, its rheological properties, its pH, and other properties.

A particularly preferred embodiment comprises a battery cell, preferably a lithium-ion cell, comprising components which include at least one, in particular substantially oxidic, temperature-stable, poorly thermally conductive particle from glass material or another glass-based material or from glass-ceramics as a glass-based constituent in/at the separator, or in/at the anode, or in/at the cathode, or in the liquid or polymer electrolyte, wherein the glass-based constituent has a low thermal conductivity of less than 2.5 W/m·K, and thereby is particularly useful to separate and/or preferably also to locally restrict thermal anomalies such as local overheating.

The invention claimed is:

1. A lithium-ion battery cell, comprising:
   at least one glass-based component comprising a substantially oxidic, temperature-stable, poorly thermally conductive particle,
   said particle being selected from the group consisting of a glass material, a glass-based material, and a glass-ceramic material,
   wherein said glass-based component is in a position within the battery cell selected from the group consisting of in a separator, at the separator, in an anode, at the anode, in a cathode, at a cathode, and in a liquid or polymer electrolyte,
   wherein said glass-based component has a thermal conductivity of less than 2.5 W/K·m and is suitable to separate and/or locally restrict thermal anomalies, and
   wherein for the component with:
   a being the reciprocal thermal diffusivity;
   b being the slope of the viscosity curve as a function of temperature; and
   c being the absolute value of the transformation temperature,
   which are defined as follows:

$$a = \frac{\rho \cdot c_P}{\lambda}$$

wherein
ρ is the density in g/cc;
cP is the specific heat capacity in J/(g·K); and
λ is the thermal conductivity in W/(m·K), wherein the thermal conductivity is measured at 90° C.; and $$b = \frac{T_{7.6} - T_{13}}{13 - 7.6} = \frac{T_{7.6} - T_{13}}{5.4}$$

with T in K, wherein $T_{7.6}$ and $T_{13}$ denote the temperatures at which the decadic logarithm of the respective viscosity η, measured in dPa·s, takes the values of 7.6 and 13, respectively; and $c = T_g$ [K];

the following applies to preferred glasses of a first variation 1:

$a*b*c \geq 50 \, s \cdot K^2/m^2$ [×10$^8$]; and the following applies to preferred glasses of a second variation 2:

$a/(b*c) \geq 20 \, s/(m^2 \cdot K^2)$.

2. The lithium-ion cell as claimed in claim 1, wherein the thermal conductivity is less than 2.0 W·K$^{-1}$·m$^{-1}$.

3. The lithium-ion cell as claimed in claim 1, wherein said glass-based component is an inorganic, multi-functional constituent selected from the group consisting of glass, glass-ceramic, phase-demixed glass, and multi-phase glass.

4. The lithium-ion cell as claimed in claim 3, wherein said glass-based component is chemically stable in an electrolyte solution comprising LiPF$_6$ so that during a one-week storage of said glass-based component in the electrolyte solution at 60° C., not more than 1 mass % of said glass-based component is dissolved.

5. The lithium-ion cell as claimed in claim 1, wherein said glass-based component is a predominantly oxidic glass and has a fraction of non-oxidic elements that does not exceed 35 mass %.

6. The lithium-ion cell as claimed in claim 1, wherein said glass-based component comprises at least 80% of oxygen as an anion and is free of chalcogenide anions except oxygen.

7. The lithium-ion cell as claimed in claim 1, wherein said glass-based component is an oxide-based multicomponent glass.

8. The lithium-ion cell as claimed in claim 1, wherein said glass-based component is selected from the group consisting of silicate glass, borate glass, phosphate glass, and aluminate glass.

9. The lithium-ion cell as claimed in claim 1, comprising a volume fraction of crystalline ceramic particles of up to 95% by volume.

10. The lithium-ion cell as claimed in claim 1, wherein said at least one glass-based component is a powder.

11. The lithium-ion cell as claimed in claim 10, wherein said powder intercepts HF by forming Si—F bonds.

12. The lithium-ion cell as claimed in claim 10, wherein said powder exhibits an ionic conductivity of less than 10$^{-5}$ S/cm at room temperature.

13. The lithium-ion cell as claimed in claim 10, wherein said powder has a specific surface area ranging from 1 sqm/g to 50 sqm/g.

14. The lithium-ion cell as claimed in claim 10, wherein said powder has a dielectric constant $\in_r$ ranging from 3 to 25,000.

15. The lithium-ion cell as claimed in claim 10, wherein said powder is provided with D90 particle sizes from 100 nm to 10 µm.

16. The lithium-ion cell as claimed in claim 10, wherein the powder has particles with a surface texture or silanized surface.

17. The lithium-ion cell as claimed in claim 10, wherein said powder is in agglomerated form.

18. The lithium-ion cell as claimed in claim 1, wherein the lithium-ion cell is rechargeable.

19. The lithium-ion cell as claimed in claim 1, wherein said component is the separator.

20. The lithium-ion cell as claimed in claim 1, wherein said component is the cathode.

21. The lithium-ion cell as claimed in claim 1, wherein said component is the anode.

22. The lithium-ion cell as claimed in claim 1, wherein said component is the liquid electrolyte.

23. The lithium-ion cell as claimed in claim 1, comprising an inorganic constituent which is produced using a process step of melting at temperatures below 2000° C. and cooling rapidly.

24. The lithium-ion cell as claimed in claim 1, wherein said glass-based component comprises a glass composition selected from the group consisting of Silicatic Glass, Phosphate Glass A, Phosphate Glass B, Borate Glass, and Aluminate Glass, wherein:

the Silicatic Glass has a composition of (in wt %):

|  | Min | Max |
| --- | --- | --- |
| $SiO_2$ | 45 | 100 |
| $TiO_2$ | 0 | 10 |
| $ZrO_2$ | 0 | 10 |
| $Al_2O_3$ | 0 | 42 |
| $B_2O_3$ | 0 | 30 |
| $Fe_2O_3$ | 0 | 0.5 |
| $P_2O_5$ | 0 | 10 |
| MgO | 0 | 20 |
| CaO | 0 | 20 |
| BaO | 0 | 20 |
| MnO | 0 | 20 |
| ZnO | 0 | 10 |
| $Li_2O$ | 0 | 50 |
| $Na_2O$ | 0 | 10 |
| $K_2O$ | 0 | 10 |
| $La_2O_3$ | 0 | 10 |
| SrO | 0 | 10 |
| Halogen (elementary) | 0 | 20 |
| $As_2O_3$ | 0 | 1.5 |
| $Sb_2O_3$ | 0 | 1.5 |
| $Cs_2O$ | 0 | 10 |
| $Nb_2O_3$ | 0 | 40 |
| RE (except $La_2O_3$) | 0 | 5 |
| $SnO_2$ | 0 | 1.5 |
| NiO | 0 | 20 |
| CoO | 0 | 20 |
| $Ta_2O_5$ | 0 | 25 |
| SnO | 0 | 1.5 |
| SrO | 0 | 20 | the Phosphate Glass A has a composition of (in wt %):

|  | Min | Max |
| --- | --- | --- |
| $SiO_2$ | 0 | 30 |
| $TiO_2$ | 0 | 40 |
| $ZrO_2$ | 0 | 10 |
| $Al_2O_3$ | 0 | 30 |
| $B_2O_3$ | 0 | 30 |
| $Fe_2O_3$ | 0 | 0.5 |
| $P_2O_5$ | 20 | 100 |
| MgO | 0 | 20 |
| CaO | 0 | 20 |
| BaO | 0 | 20 |
| MnO | 0 | 20 |
| ZnO | 0 | 10 |
| $Li_2O$ | 0 | 50 |
| $Na_2O$ | 0 | 10 |
| $K_2O$ | 0 | 10 |
| $La_2O_3$ | 0 | 10 |
| SrO | 0 | 10 |
| Halogen (elementary) | 0 | 35 |
| $As_2O_3$ | 0 | 1.5 |
| $Sb_2O_3$ | 0 | 1.5 |
| $Cs_2O$ | 0 | 10 |
| $Nb_2O_3$ | 0 | 40 |
| RE (except $La_2O_3$) | 0 | 5 |
| $SnO_2$ | 0 | 1.5 |
| NiO | 0 | 20 |
| CoO | 0 | 20 |
| $Ta_2O_5$ | 0 | 10 |
| SnO | 0 | 65 |
| SrO | 0 | 20 | the Phosphate Glass B has a composition of (in wt %):

|  | Min | Max |
| --- | --- | --- |
| $SiO_2$ | 0 | 30 |
| $TiO_2$ | 0 | 40 |
| $ZrO_2$ | 0 | 10 |
| $Al_2O_3$ | 0 | 30 |
| $B_2O_3$ | 0 | 30 |
| $Fe_2O_3$ | 0 | 7.5 |
| $P_2O_5$ | 20 | 100 |
| MgO | 0 | 20 |
| CaO | 0 | 20 |
| BaO | 0 | 20 |
| MnO | 0 | 20 |
| ZnO | 0 | 20 |
| $Li_2O$ | 0 | 50 |
| $Na_2O$ | 0 | 35 |
| $K_2O$ | 0 | 30 |
| $La_2O_3$ | 0 | 10 |
| SrO | 0 | 10 |
| Halogen (elementary) | 0 | 35 |
| $As_2O_3$ | 0 | 1.5 |
| $Sb_2O_3$ | 0 | 1.5 |
| $Cs_2O$ | 0 | 10 |
| $Nb_2O_3$ | 0 | 40 |
| RE (except $La_2O_3$) | 0 | 5 |
| $SnO_2$ | 0 | 1.5 |
| NiO | 0 | 20 |
| CoO | 0 | 20 |
| $Ta_2O_5$ | 0 | 20 |
| SnO | 0 | 30 |
| SrO | 0 | 5 |
| CuO | 0 | 20 |
| $Bi_2O_3$ | 0 | 30 |
| $Sb_2O_5$ | 0 | 5 | the Borate Glass has a composition of (in wt %):

|  | Min | Max |
| --- | --- | --- |
| $SiO_2$ | 0 | 30 |
| $TiO_2$ | 0 | 10 |
| $ZrO_2$ | 0 | 10 |
| $Al_2O_3$ | 0 | 30 |
| $B_2O_3$ | 20 | 100 |
| $Fe_2O_3$ | 0 | 0.5 |
| $P_2O_5$ | 0 | 10 |
| MgO | 0 | 20 |
| CaO | 0 | 20 |
| BaO | 0 | 20 |
| MnO | 0 | 20 |
| ZnO | 0 | 10 |
| $Li_2O$ | 0 | 50 |
| $Na_2O$ | 0 | 10 |
| $K_2O$ | 0 | 10 |

-continued

|  | Min | Max |
|---|---|---|
| La$_2$O$_3$ | 0 | 50 |
| SrO | 0 | 10 |
| Halogen (elementary) | 0 | 20 |
| As$_2$O$_3$ | 0 | 1.5 |
| Sb$_2$O$_3$ | 0 | 1.5 |
| Cs$_2$O | 0 | 10 |
| Nb$_2$O$_3$ | 0 | 40 |
| RE (except La$_2$O$_3$) | 0 | 5 |
| SnO$_2$ | 0 | 1.5 |
| NiO | 0 | 20 |
| CoO | 0 | 20 |
| Ta$_2$O$_5$ | 0 | 10 |
| SnO | 0 | 1.5 |
| SrO | 0 | 20 | and the Aluminate Glass has a composition of (in wt %):

|  | Min | Max |
|---|---|---|
| SiO$_2$ | 0 | 30 |
| TiO$_2$ | 0 | 10 |
| ZrO$_2$ | 0 | 10 |
| Al$_2$O$_3$ | 25 | 100 |
| B$_2$O$_3$ | 0 | 30 |
| Fe$_2$O$_3$ | 0 | 0.5 |
| P$_2$O$_5$ | 0 | 10 |
| MgO | 0 | 20 |
| CaO | 0 | 20 |
| BaO | 0 | 20 |
| MnO | 0 | 20 |
| ZnO | 0 | 10 |
| Li$_2$O | 0 | 50 |
| Na$_2$O | 0 | 10 |
| K$_2$O | 0 | 10 |
| La$_2$O$_3$ | 0 | 10 |
| SrO | 0 | 10 |
| Halogen (elementary) | 0 | 20 |
| As$_2$O$_3$ | 0 | 1.5 |
| Sb$_2$O$_3$ | 0 | 1.5 |
| Cs$_2$O | 0 | 10 |
| Nb$_2$O$_3$ | 0 | 40 |
| RE (except La$_2$O$_3$) | 0 | 5 |
| SnO$_2$ | 0 | 1.5 |
| NiO | 0 | 20 |
| CoO | 0 | 20 |
| Ta$_2$O$_5$ | 0 | 10 |
| SnO | 0 | 1.5 |
| SrO | 0 | 20. |

25. The lithium-ion cell as claimed in claim 24, wherein constituents of said glass-based component are provided in a mixing ratio of low-melting to high-melting glasses from 50:50 to 80:20.

26. The lithium-ion cell as claimed in claim 1, wherein said glass-based component comprises a glass composition selected from the group consisting of Borate Glass (1), Phosphate Glass (1), Aluminate Glass (1), Silicate Glass (1), Phosphate Glass (2), Phosphate Glass (3), Phosphate Glass (4), Phosphate Glass (5), Phosphate Glass (6), and Phosphate Glass (7), the glass composition comprising (expressed in wt %):

| Type | Borate Glass (1) | Phosphate Glass (1) | Aluminate Glass (1) | Silicate Glass (1) | Phosphate Glass (2) |
|---|---|---|---|---|---|
| SiO$_2$ | 20 |  |  | 60 | 1 |
| TiO$_2$ |  |  |  |  |  |
| ZrO$_2$ |  |  |  |  |  |
| Al$_2$O$_3$ | 15 |  | 25 | 17 | 4 |
| B$_2$O$_3$ | 25 |  | 45 | 7 | 1 |
| Fe$_2$O$_3$ |  |  |  |  |  |
| Cr$_2$O$_3$ |  |  |  |  |  |
| P$_2$O$_5$ |  | 35 |  |  | 70 |
| MgO |  |  | 15 | 2 | 1 |
| CaO | 10 |  | 15 | 10 | 3.5 |
| BaO | 15 |  |  | 3.5 | 10 |
| MnO |  |  |  |  |  |
| ZnO |  | 5 |  |  | 5 |
| PbO |  |  |  |  |  |
| Li$_2$O | 3 |  |  |  |  |
| Na$_2$O | 2 |  |  |  | 0.5 |
| K$_2$O | 10 |  |  |  | 2 |
| SnO |  | 60 |  |  |  |
| SnO$_2$ |  |  |  | 0.5 |  |
| NiO |  |  |  |  | 1 |
| CoO |  |  |  |  | 1 |
| a/(b * c) [s/(K$^2$ · m$^2$)] | 99 | 780 | 116 | 42 | 139 | and

| Type | Phosphate Glass (3) | Phosphate Glass (4) | Phosphate Glass (5) | Phosphate Glass (6) | Phosphate Glass (7) |
|---|---|---|---|---|---|
| SiO$_2$ |  |  |  | 0.9 |  |
| TiO$_2$ |  | 0.5 |  |  |  |
| ZrO$_2$ |  |  |  |  |  |
| Al$_2$O$_3$ |  | 1.5 | 0.9 | 5.6 | 12.7 |
| B$_2$O$_3$ |  |  |  |  |  |
| Fe$_2$O$_3$ |  |  |  |  | 6.6 |
| Cr$_2$O$_3$ |  |  |  |  |  |
| P$_2$O$_5$ | 59.3 | 58.0 | 81.5 | 65.3 | 70.4 |
| MgO |  |  | 0.9 |  |  |
| CaO |  |  |  |  |  |
| SrO |  |  |  | 2.7 |  |
| BaO |  |  | 1.4 |  |  |
| MnO |  |  |  |  |  |
| ZnO |  | 16.0 | 7.0 |  |  |
| PbO |  |  |  |  |  |
| Li$_2$O |  | 0.5 | 5.15 |  |  |
| Na$_2$O | 32.4 | 1.5 |  |  | 10.3 |
| K$_2$O |  | 1.5 | 0.2 | 28.2 |  |
| CuO | 8.3 |  |  |  |  |
| Bi$_2$O$_3$ |  | 19.5 |  |  |  |
| Sb$_2$O$_3$ |  |  | 0.25 |  |  |
| SnO$_2$ |  | 1.0 |  |  |  |
| a/(b * c) [s/(K$^2$ · m$^2$)] | 702 | 288 | 494 | 1085 | 393. |

* * * * *